US012661824B2

(12) United States Patent
Schlögel et al.

(10) Patent No.: US 12,661,824 B2
(45) Date of Patent: Jun. 23, 2026

(54) CIRCULAR SAWS HAVING A BLADE THAT MOVES RELATIVE TO A STATIONARY BASE STRUCTURE DURING OPERATIVE USE OF THE CIRCULAR SAWS TO CUT A WORKPIECE AND METHODS OF DETECTING A KICKBACK CONDITION OF SUCH CIRCULAR SAWS

(71) Applicant: Festool GmbH, Wendlingen (DE)

(72) Inventors: Maximilian Markus Schlögel, Hattenhofen (DE); Markus Schmid, Uhingen (DE); Markus Wildermuth, Denkendorf (DE); Josua Frank, Urbach (DE); Dominik Hilpert, Suessen (DE)

(73) Assignee: Festool GmbH, Wendlingen (DE)

( * ) Notice: Subject to any disclaimer, the term of this patent is extended or adjusted under 35 U.S.C. 154(b) by 352 days.

(21) Appl. No.: 18/546,835

(22) PCT Filed: Feb. 18, 2022

(86) PCT No.: PCT/EP2022/054148
§ 371 (c)(1),
(2) Date: Aug. 17, 2023

(87) PCT Pub. No.: WO2022/175489
PCT Pub. Date: Aug. 25, 2022

(65) Prior Publication Data
US 2024/0131605 A1       Apr. 25, 2024
US 2024/0227045 A9       Jul. 11, 2024

Related U.S. Application Data

(60) Provisional application No. 63/151,227, filed on Feb. 19, 2021.

(51) Int. Cl.
*B27G 19/04* (2006.01)
*B23D 59/00* (2006.01)

(52) U.S. Cl.
CPC ........... *B27G 19/04* (2013.01); *B23D 59/005* (2013.01)

(58) Field of Classification Search
CPC ........ B27G 19/02; B27G 19/04; B27G 19/00; B23D 59/005; B23D 59/00
(Continued)

(56) References Cited

U.S. PATENT DOCUMENTS 7,055,417 B1 *   6/2006   Gass .......................... F16P 3/12
                                                      83/477.1
7,290,472 B2 *  11/2007   Gass .......................... B27B 5/38
                                                      83/477.2
(Continued)

FOREIGN PATENT DOCUMENTS

CN        110869178 A        3/2020
DE     10 2017 211270        1/2019
(Continued)

OTHER PUBLICATIONS

Office Action issued in Chinese Patent Application No. 202280015965.0 on Sep. 25, 2025 (with English translation), 25 pages.
(Continued)

*Primary Examiner* — Nhat Chieu Q Do
(74) *Attorney, Agent, or Firm* — Grüneberg Global IP, PLLC

(57) ABSTRACT
A circular saw has a blade that moves relative to a stationary base structure during operative use of the circular saw to cut a workpiece and methods of detecting a kickback condition of such a circular saw. The circular saw includes a base structure, a user-actuated assembly, an attachment structure, and a controller. The attachment structure is configured to
(Continued)

permit constrained relative motion between the base structure and the user-actuated assembly in a motion direction and during operative use of the circular saw to cut the workpiece. A motion sensor is configured to generate a motion signal indicative of motion of the user-actuated assembly along the motion direction. The controller is programmed to initiate a kickback response of the circular saw responsive to the motion signal being indicative of a kickback condition of the circular saw.

15 Claims, 7 Drawing Sheets

(58) Field of Classification Search
USPC .......................................................... 83/62.1
See application file for complete search history.

(56) References Cited

U.S. PATENT DOCUMENTS

| | | | |
|---|---|---|---|
| 7,347,131 B2 | 3/2008 | Gass | |
| 7,991,503 B2 | 8/2011 | Gass | |
| 10,883,660 B2 | 1/2021 | Nishimiya et al. | |
| 2002/0056349 A1 | 5/2002 | Gass et al. | |
| 2005/0178259 A1* | 8/2005 | Gass ........................ | B27B 13/14 |
| | | | 83/397.1 |
| 2006/0032352 A1 | 2/2006 | Gass et al. | |

| | | | |
|---|---|---|---|
| 2015/0273725 A1 | 10/2015 | Gass et al. | |
| 2020/0261992 A1 | 8/2020 | Frank et al. | |
| 2020/0276680 A1 | 9/2020 | Green et al. | |
| 2021/0154819 A1* | 5/2021 | Rusch ....................... | B25F 5/00 |
| 2021/0252733 A1 | 8/2021 | Kübeler et al. | |
| 2021/0323189 A1* | 10/2021 | Wiker ................... | B23D 45/16 |
| 2021/0370544 A1* | 12/2021 | Yabuguchi ............... | B27B 5/38 |

FOREIGN PATENT DOCUMENTS

| | | |
|---|---|---|
| DE | 10 2019 108793 | 12/2019 |
| JP | 2020-529928 A | 10/2020 |
| WO | 2011/040957 | 4/2011 |
| WO | 2020/207818 A1 | 10/2020 |

OTHER PUBLICATIONS

International Search Report dated Jul. 6, 2022, in PCT/EP2022/054148, 6 pages.
Written Opinion dated Jul. 6, 2022, in PCT/EP2022/054148, 12 pages.
Office Action received for European Patent Application No. 22706620.6, mailed on May 16, 2025, 10 pages.
Office Action issued in Chinese Patent Application No. 202280015965.0, issued Apr. 16, 2025 (with English translation), 21 pages.
Office Action issued in Japanese Patent Application No. 2023-550250 on Feb. 3, 2026, 8 pages, (with English translation).

* cited by examiner

200

210 ───   ROTATE CIRCULAR SAW BLADE

220 ───   APPLY ACTUATION FORCE

230 ───   MOVE USER-ACTUATED ASSEMBLY

240 ───   DETECT MOTION

250 ┄┄┄   DETECT WORKPIECE CONTACT PARAMETER

260 ───   INITIATE KICKBACK RESPONSE

1

CIRCULAR SAWS HAVING A BLADE THAT MOVES RELATIVE TO A STATIONARY BASE STRUCTURE DURING OPERATIVE USE OF THE CIRCULAR SAWS TO CUT A WORKPIECE AND METHODS OF DETECTING A KICKBACK CONDITION OF SUCH CIRCULAR SAWS

CROSS-REFERENCE TO RELATED APPLICATIONS

This application is the National Stage entry under § 371 of International Application No. PCT/EP2022/054148, filed on Feb. 18, 2022, and which claims priority to U.S. Provisional Patent Application No. 63/151,227, which was filed on Feb. 19, 2021, and the complete disclosure of each of which is hereby incorporated by reference.

BACKGROUND OF THE INVENTION

Field of the Invention

The present disclosure relates generally to circular saws having a blade that moves relative to a stationary base structure during operative use of the circular saws to cut a workpiece and to methods of detecting a kickback condition of such circular saws.

Description of Related Art

Power tools, such as circular saws, may, under certain operational conditions, behave unpredictably, such as by rapidly accelerating in an unexpected and/or undesired manner. Such behavior may be referred to herein as a "kickback condition" of the power tool. As an example, when cutting a workpiece utilizing a circular saw, the workpiece may extend on both lateral sides of a circular saw blade of the circular saw. If the workpiece is permitted to bind with the sides of the circular saw blade and/or to pinch the sides of the circular saw blade, frictional forces between the sides of the circular saw blade and the workpiece may provide a motive force for kickback of the circular saw. As another example, if the circular saw blade unexpectedly cuts deeply into the workpiece and/or enters an uncharacteristically hard, or soft, region of the workpiece, the change in forces acting on the circular saw may manifest in a kickback condition.

Mechanisms for detecting, and responding to, kickback conditions have been developed. However, these mechanisms may be specific to a certain type, or class, of power tool and/or may not be effective in all power tools. For example, some circular saws have a blade that rotates about a fixed axis relative to the base of the circular saw during operative use of the circular saw. For these circular saws, detecting a kickback condition may be intended primarily to prevent the workpiece from being accelerated toward a user.

On the other hand, some circular saws have a blade that rotates about an axis that moves relative to a stationary base structure of the circular saw during operative use of the circular saw. As examples, the axis may move by translating and/or pivoting relative to the stationary base structure. For these circular saws, detecting a kickback condition may be desirable to limit or prevent the saw blade and the corresponding portion of the circular saw to which the blade is mounted from being translated, pivoted, or otherwise unexpectedly moved relative to and/or toward a user. Thus, there exists a need for improved circular saws having a blade that moves relative to a stationary base structure during operative use of the circular saws to cut a workpiece and/or for improved methods of detecting a kickback condition of such circular saws.

SUMMARY OF THE DISCLOSURE

Circular saws having a blade that moves relative to a stationary base structure during operative use of the circular saws to cut a workpiece and methods of detecting a kickback condition of such circular saws. The circular saws include a base structure, a user-actuated assembly, an attachment structure, and a controller. The base structure includes a saw support and a workpiece support. The user-actuated assembly includes a motor, an arbor, and a motion sensor. The motor includes a motor shaft configured to rotate about a shaft rotational axis. The arbor is operatively attached to the motor shaft and is configured to receive a circular saw blade and to rotate the circular saw blade within a blade rotation plane. The user-actuated assembly is operatively attached to the base structure via the attachment structure such that the workpiece support faces toward the user-actuated assembly. The attachment structure is configured to permit constrained relative motion between the base structure and the user-actuated assembly in a motion direction and during operative use of the circular saw to cut the workpiece. The motion sensor is configured to detect motion of the user-actuated assembly along the motion direction and to generate a motion signal indicative of the motion of the user-actuated assembly along the motion direction. The controller is programmed to receive the motion signal and to initiate a kickback response of the circular saw responsive to the motion signal being indicative of a kickback condition of the circular saw.

The methods include rotating a circular saw blade of a circular saw within a blade rotation plane. The methods also include applying an actuation force to a user-actuated assembly of the circular saw and, responsive to the applying, moving the user-actuated assembly in a motion direction relative to a base structure of the circular saw. The methods further include detecting motion of the user-actuated assembly along the motion direction with a motion sensor of the user-actuated assembly and initiating a kickback response of the circular saw responsive to the motion of the user-actuated assembly being indicative of a kickback condition of the circular saw.

DETAILED DESCRIPTION AND BEST MODE OF THE DISCLOSURE

Figure 1:
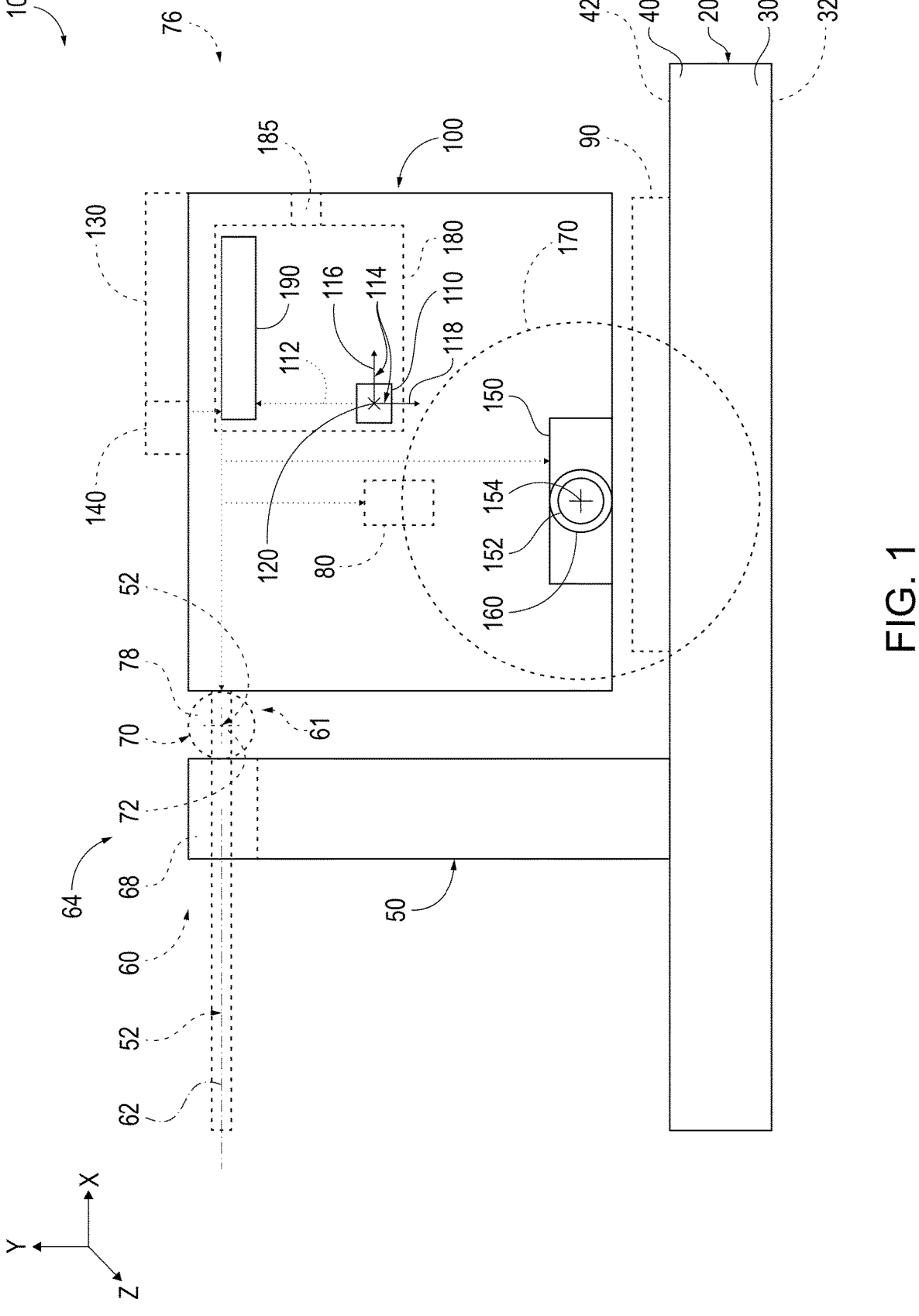
FIG. 1 is a schematic illustration of examples of circular saws according to the present disclosure.

FIGS. 1-9 provide examples of circular saws 10, of components of circular saws 10, of parameters that may be measured during operative use of circular saws 10, and/or of methods 200, according to the present disclosure. Elements that serve a similar, or at least substantially similar, purpose are labeled with like numbers in each of FIGS. 1-9, and these elements may not be discussed in detail herein with reference to each of FIGS. 1-9. Similarly, all elements may not be labeled in each of FIGS. 1-9, but reference numerals associated therewith may be utilized herein for consistency. Elements, components, and/or features that are discussed herein with reference to one or more of FIGS. 1-9 may be included in and/or utilized with any of FIGS. 1-9 without departing from the scope of the present disclosure.

In general, elements that are likely to be included in a particular embodiment are illustrated in solid lines, while elements that are optional are illustrated in dashed lines. However, elements that are shown in solid lines may not be essential to all embodiments and, in some embodiments, may be omitted without departing from the scope of the present disclosure.

Figure 3:
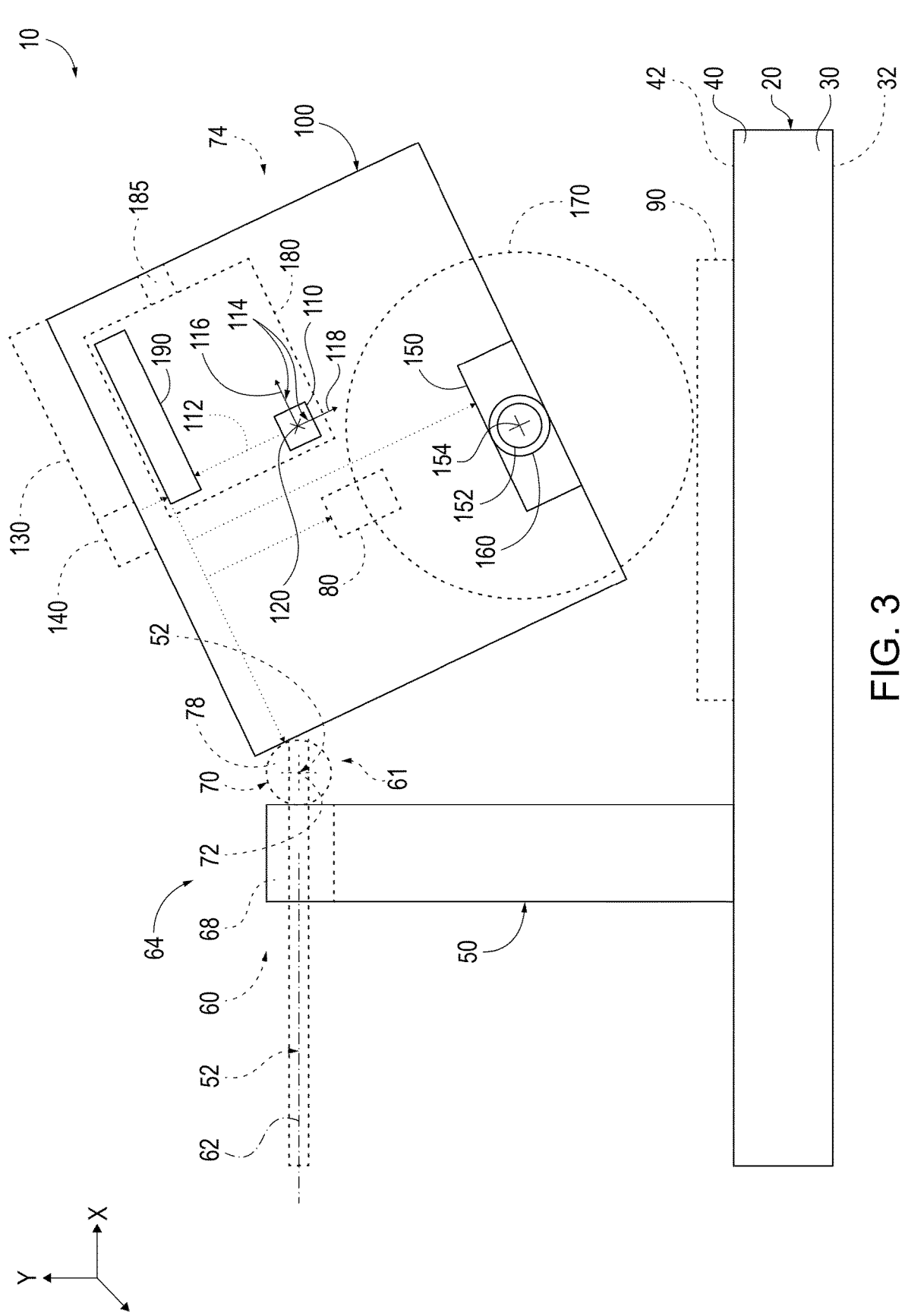
FIG. 3 is a schematic illustration of examples of circular saws according to the present disclosure.
Figure 4:
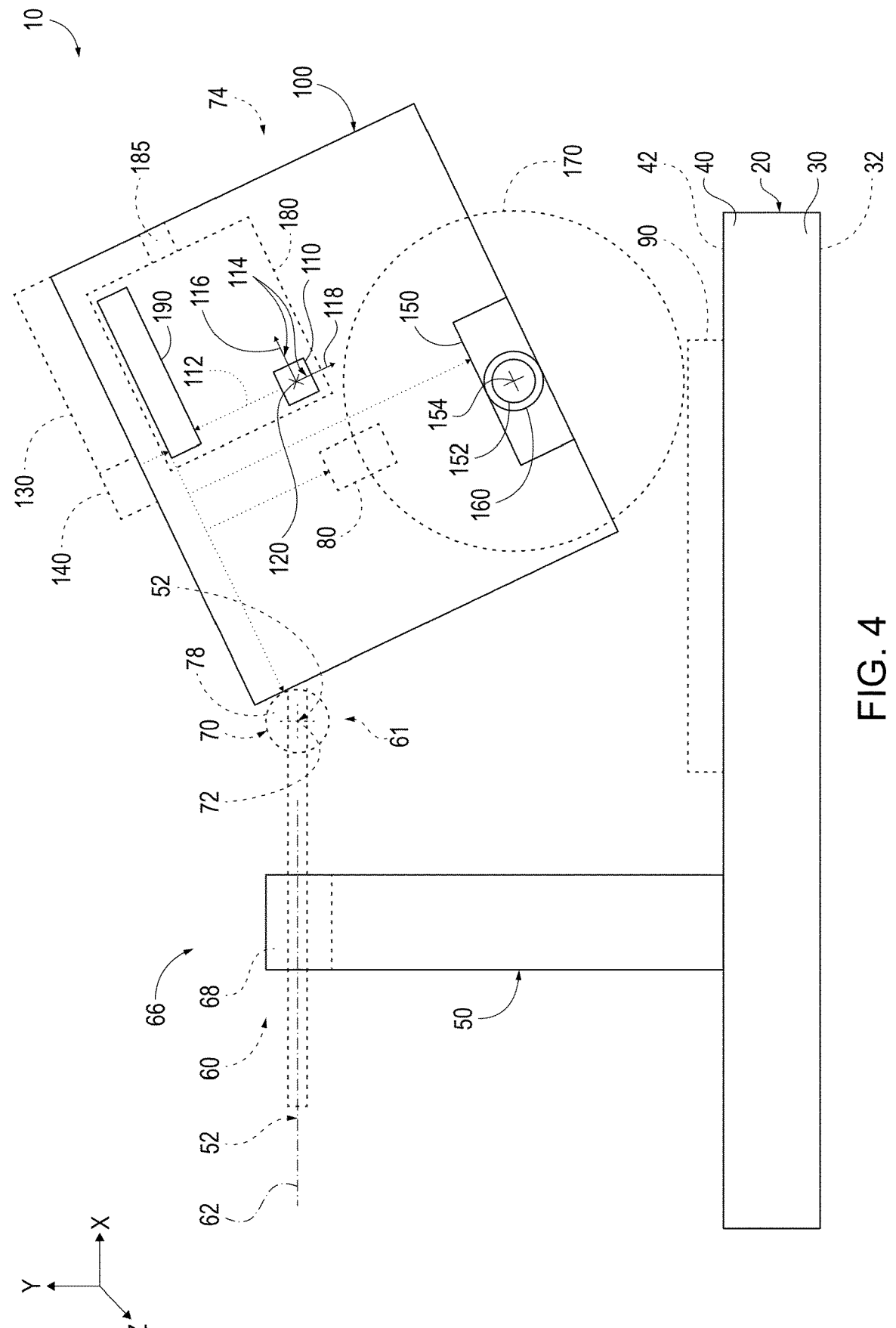
FIG. 4 is a schematic illustration of examples of circular saws according to the present disclosure.
Figure 5:
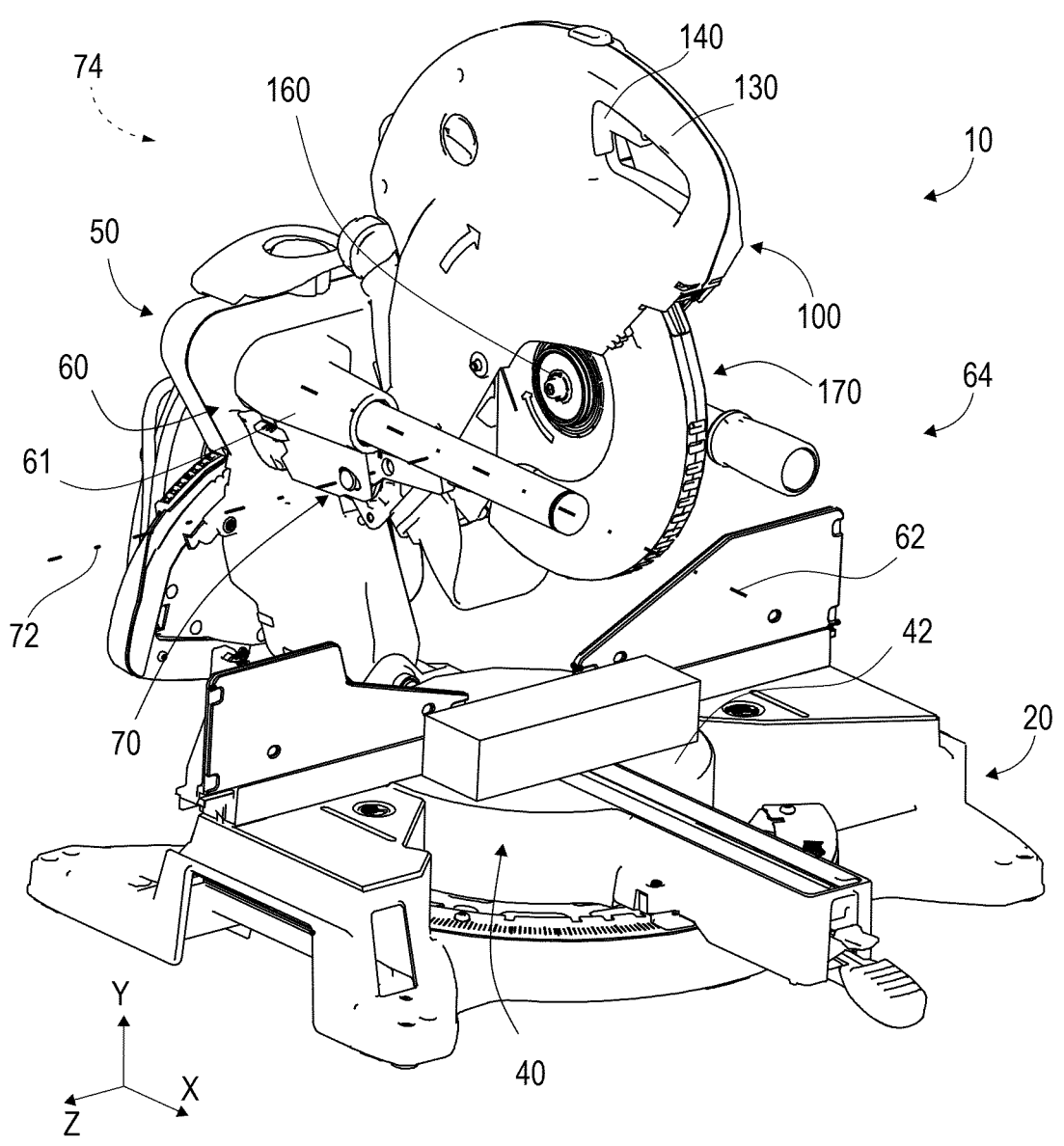
FIG. 5 is a less schematic illustration of an example of a circular saw according to the present disclosure.

FIGS. 1-4 are schematic illustrations of examples of circular saws 10 according to the present disclosure, and FIG. 5 is a less schematic illustration of an example of a circular saw 10 according to the present disclosure. As illustrated in FIGS. 1-5, circular saws 10 include a base structure 20, an attachment structure 50, a user-actuated assembly 100, and a controller 190. Base structure 20 includes a saw support 30 and a workpiece support 40, and base structure 20 additionally or alternatively may be referred to herein as a stationary base structure 20. User-actuated assembly 100 is operatively attached to base structure 20 with, via, and/or utilizing attachment structure 50. This attachment is such that workpiece support 40 may be described as facing toward user-actuated assembly 100 and/or as being configured to support a workpiece 90 between the workpiece support and the user-actuated assembly. In addition, attachment structure 50 is configured to permit and/or to facilitate limited and/or constrained relative motion between base structure 20 and user-actuated assembly 100 in a motion direction. This motion direction may be along and/or about a motion axis 52 and may occur during operative use of the circular saw, namely, use of the circular saw to cut workpiece 90. Examples of such relative motion include a translational motion and/or a pivotal motion. Stated another way, relative motion between base structure 20 and user-actuated assembly 100, along and/or about motion axis 52, may cause, or may be utilized to produce, operative engagement and/or physical contact between a circular saw blade 170 of user-actuated assembly 100 and workpiece 90. This operative engagement may permit and/or facilitate cutting of the workpiece by the circular saw blade.

User-actuated assembly 100 includes a motion sensor 110, a motor 150, and an arbor 160. Motor 150 includes a motor shaft 152 configured to rotate about a shaft rotational axis 154. Arbor 160 is operatively attached to motor shaft 152 and/or is configured to receive circular saw blade 170, to convey a motive force from motor 150 to the circular saw blade, and/or to rotate the circular saw blade within a blade rotation plane, such as may be parallel to the X-Y plane of FIGS. 1-5 and/or perpendicular to shaft rotational axis 154. As discussed in more detail herein, user-actuated assembly 100, according to the present disclosure, is configured to move, such as to translate and/or pivot, relative to base structure 20 during operative use of the circular saw to cut workpiece 90. This motion of user-actuated assembly 100 may cause circular saw blade 170, which is mounted on or otherwise received by arbor 160 of the user-actuated assembly, also to move, such as to translate and/or pivot, relative to the base structure during operative use of the circular saw to cut the workpiece.

Motion sensor 110 is configured to detect motion, such as at least one speed, rotational speed, velocity, rotational velocity, acceleration, and/or rotational acceleration, of user-actuated assembly 100 along and/or about motion axis 52. Motion sensor 110 additionally or alternatively may be configured to generate a motion signal 112 indicative of the motion of the user-actuated assembly along the motion direction. Controller 190 is programmed to receive motion signal 112 and/or to initiate a kickback response of circular saw 10 responsive to the motion signal being indicative of a kickback condition of the circular saw.

During operative use of circular saw 10 to cut workpiece 90, and as discussed in more detail herein, circular saw 10 may be positioned such that saw support 30 supports the circular saw, such as on a ground surface, on a table, and/or on a stand. Stated another way, base structure 20 and/or saw support 30 thereof may be stationary during operative use of circular saw 10 to cut workpiece 90. Subsequently, motor 150 may be utilized to apply a rotational motive force to circular saw blade 170, such as to rotate the circular saw blade within the blade rotation plane and/or about shaft rotational axis 154. At least partially concurrently with this rotation, a user of circular saw 10 may apply an actuation force to user-actuated assembly 100 to urge the user-actuated assembly to move in the motion direction, such as about and/or along at least one motion axis 52.

In some examples, and as discussed in more detail herein, this actuation force may cause user-actuated assembly 100 to move, relative to base structure 20, along motion axis 52 in the form of a linear motion axis 62, thereby permitting and/or facilitating contact and/or engagement between circular saw blade 170 and workpiece 90. In some examples, and as also discussed in more detail herein, this actuation force may cause user-actuated assembly 100 to rotate, relative to base structure 20, about motion axis 52 in the form of a rotary motion axis 72, thereby permitting and/or facilitating contact and/or engagement between circular saw blade 170 and workpiece 90. The contact and/or engagement between the circular saw blade and the workpiece may cause the circular saw blade to cut the workpiece.

During this cutting of workpiece 90 by circular saw blade 170, a kickback condition may occur. As used herein, the phrase "kickback condition" may refer to a condition in which the circular saw, or at least a region of the circular saw, such as user-actuated assembly 100, moves, or is urged to move, in an unexpected and/or unpredicted manner during operative use of the circular saw to cut the workpiece. Such motion may include unexpected linear and/or rotational motion and/or acceleration of the region of the circular saw and has a potential to startle the user of the circular saw, cause the user-actuated assembly to accelerate relative to and/or toward the user of the circular saw, and/or cause damage to the workpiece.

However, as discussed in more detail herein, controller 190 of circular saws 10 may be configured to determine that the kickback condition exists and/or to initiate the kickback response upon detection of and/or responsive to the kickback condition. As also discussed in more detail herein, the kickback response may be such that circular saws 10, according to the present disclosure, decrease the potential to startle the user of the circular saw, decrease a magnitude of motion and/or acceleration of the user-actuated assembly relative to and/or toward the user, and/or decrease the potential for damage to the workpiece compared to conventional circular saws that do not include motion sensors 110 and/or controllers 190, according to the present disclosure.

Attachment structure 50 may include any suitable structure that may be adapted, configured, designed, and/or constructed to operatively attach user-actuated assembly 100 to base structure 20 and/or to permit the constrained relative motion between the user-actuated assembly and the base structure in the motion direction. As discussed, the motion direction may be along and/or about motion axis 52. In some examples, attachment structure 50 may be configured to permit the constrained relative motion between base structure 20 and user-actuated assembly 100 responsive to receipt of the actuation force from the user of the circular saw.

In some examples, and as discussed, the motion direction may include, or only may include, a, or a single, linear motion component, such as may be directed along linear motion axis 62. Stated another way, the constrained relative motion between base structure 20 and user-actuated assembly 100 may be along, and in some examples only along, linear motion axis 62, or a single linear motion axis 62. Stated yet another way, linear and/or translational relative motion between base structure 20 and user-actuated assembly 100 may be along, and in some examples only along, linear motion axis 62, or the single linear motion axis 62.

In examples of attachment structures 50 that permit and/or facilitate constrained linear motion along, or only along, linear motion axis 62, the linear motion axis may extend parallel, or at least substantially parallel, to the blade rotation plane of circular saw blade 170. Additionally or alternatively, linear motion axis 62 may extend toward and/or away from the user during operative use of the circular saw to cut the workpiece. Thus, any kickback motion of user-actuated assembly 100 that is along linear motion axis 62 may be especially startling to the user. As such, it may be especially beneficial that circular saws 10, according to the present disclosure, are configured to respond to the kickback condition, such as by mitigating, or decreasing, this linear motion.

Attachment structure 50 may include any suitable structure that may be adapted, configured, designed, and/or constructed to permit and/or to facilitate limited linear motion of user-actuated assembly 100 relative to base structure 20 along linear motion axis 62. As an example, attachment structure 50 may include a linear guide 60. Examples of linear guide 60 include a rail and shuttle, a linear bearing assembly, and/or a guide rail. Linear guide 60 may be configured to permit and/or facilitate the limited linear motion along linear motion axis 62 between a retracted orientation 64, as illustrated in FIGS. 1, 3, and 5, and an extended orientation 66, as illustrated in FIGS. 2 and 4.

Figure 2:
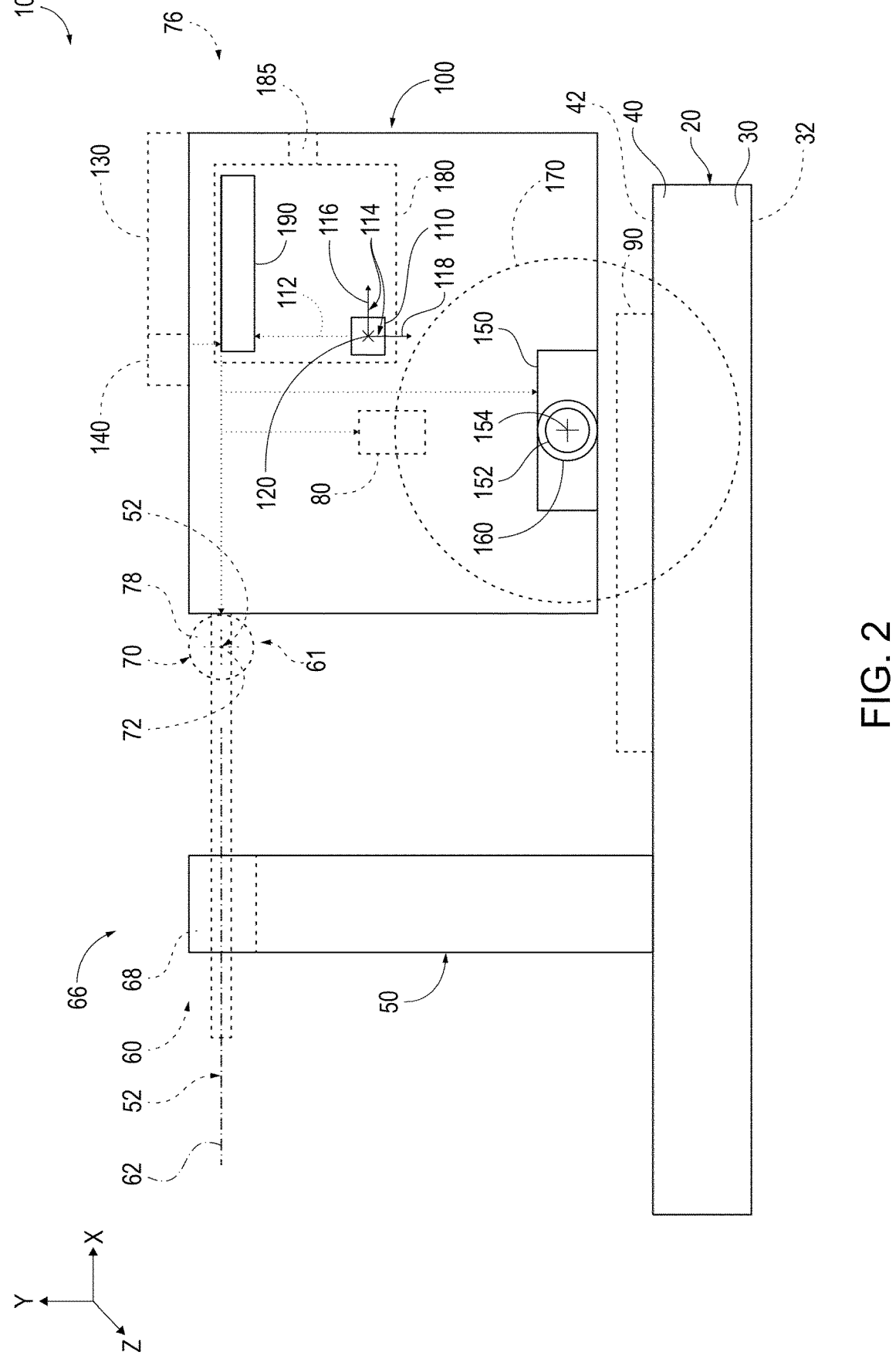
FIG. 2 is a schematic illustration of examples of circular saws according to the present disclosure.
Figure 6:
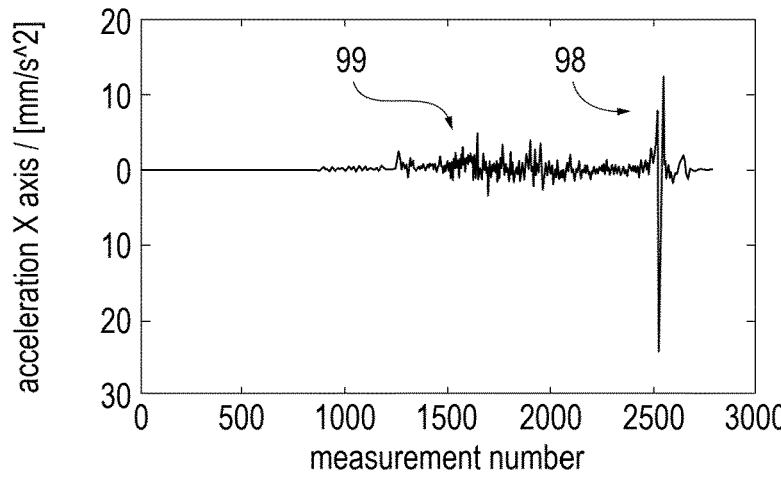
FIG. 6 is an illustration of an example of linear acceleration detected along a first linear detection axis during a kickback condition, according to the present disclosure.

In examples of circular saws 10 where attachment structure 50 permits and/or facilitates the limited linear motion along linear motion axis 62, motion sensor 110 may include a linear detection axis 114 that is aligned, or at least substantially aligned, with linear motion axis 62, as illustrated in FIGS. 1-2. In some such examples, controller 190 may be programmed to initiate the kickback response if and/or when motion signal 112 indicates that linear acceleration along linear detection axis 114 is greater than a threshold linear acceleration magnitude. The threshold linear acceleration magnitude may be selected, or predetermined, based on one or more of a number of factors, such as the type of circular saw, the size of circular saw blade, the speed at which the circular saw blade is intended to rotate during operative use of the circular saw, manufacturing considerations, manufacturer and/or operator preferences, etc. FIG. 6 illustrates an example of measured acceleration along linear detection axis 114 as a function of time during a kickback condition, which is indicated at 98. As illustrated therein, the kickback condition is clearly visible as a significant increase in acceleration measured by the motion sensor.

Figure 7:
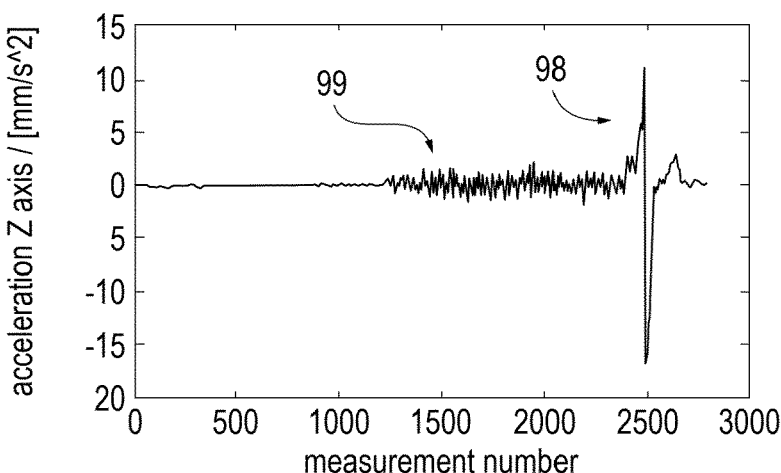
FIG. 7 is an illustration of an example of linear acceleration detected along a second linear detection axis during a kickback condition, according to the present disclosure.

In some such examples, motion sensor 110 may include a first linear detection axis 116 and a second linear detection axis 118. The first linear detection axis may be parallel, or at least substantially parallel, to linear motion axis 62, as illustrated in FIGS. 1-2. The second linear detection axis may be perpendicular, or at least substantially perpendicular, to the first linear detection axis, as illustrated in FIGS. 1-5. Additionally or alternatively, the second linear detection axis may be aligned, or at least substantially aligned, with gravity, as illustrated in FIGS. 1-2. FIG. 6 illustrates acceleration measured by motion sensor 110 along first linear detection axis 116 during kickback condition 98, while FIG. 7 illustrates acceleration measured by motion sensor 110 along second linear detection axis 118 during kickback condition 98. Once again, the kickback condition is clearly visible as a significant increase in acceleration measured by the motion sensor in both directions.

Figure 8:
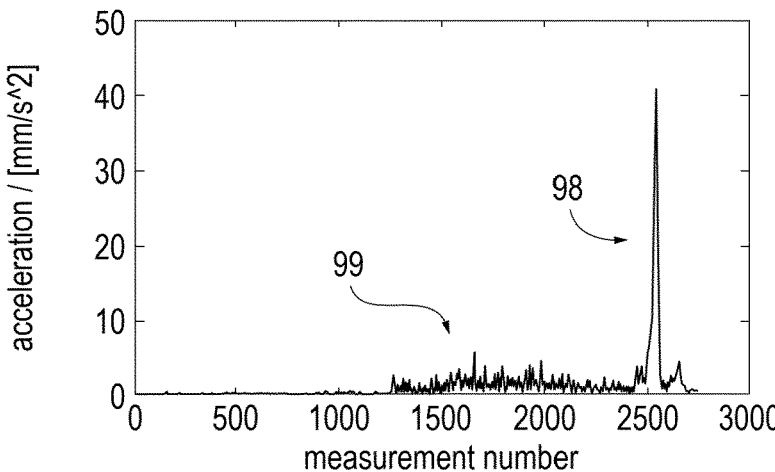
FIG. 8 is an illustration of an example of a scalar sum of an absolute value of the linear acceleration detected along the first linear detection axis and an absolute value of the linear acceleration detected along the second linear detection axis, according to the present disclosure.

In some such examples, controller 190 may be programmed to initiate the kickback response if and/or when motion signal 112 indicates that a vector sum of linear acceleration along first linear detection axis 116 and second linear detection axis 118 is greater than the threshold linear acceleration magnitude. In some such examples, controller 190 may be programmed to initiate the kickback response if and/or when motion signal 112 indicates that a scalar sum of an absolute value of linear acceleration along first linear detection axis 116 and an absolute value of linear acceleration along second linear detection axis 118 is greater than the threshold linear acceleration magnitude. FIG. 8 illustrates an example of this scalar sum. As may be seen by comparing FIG. 8 to FIGS. 6-7, the scalar sum significantly improves the signal-to-noise ratio for detection of kickback condition 98.

As discussed, controller 190 further is programmed to initiate the kickback response of the circular saw responsive to the motion signal being indicative of the kickback condition. In some examples, controller 190 may be programmed to stop and/or to dampen motion of user-actuated assembly 100 along linear motion axis 62 as the kickback response, such as to decrease, or to decrease a potential for, motion and/or acceleration of user-actuated assembly 100 toward the user during the kickback condition. In some such examples, circular saw 10 may include a linear motion axis braking structure 68, which may be configured to selectively resist, or stop, motion of user-actuated assembly 100 along linear motion axis 62. In some such examples, controller 190 may be programmed to actuate linear motion axis braking structure 68 as the kickback response. Examples of linear motion axis braking structure 68 include any suitable damper, fluid damper, brake, brake pad, and/or friction-enhancing device that may be configured to stop and/or to dampen the motion of the user-actuated assembly along the linear motion axis. As an example, the damper or the fluid damper may be coupled to attachment structure 50 and user-actuated assembly 100. Controller 190 may be configured to close a valve of the damper or the fluid damper to increase resistance to, or damping of, a movement of user-actuated assembly 100 along linear motion axis 62 as the kickback response. As another example, a brake pad may be arranged along linear motion axis 62 on attachment structure 50 or linear guide 60, and a brake cam may be disposed on user-actuated assembly 100. Controller 190 may be configured to bring the brake cam into engagement with the brake pad as the kickback response.

In some examples, and as discussed in more detail herein, the motion direction may include, or only may include, a, or a single, rotary motion component, such as may be about rotary motion axis 72. Stated another way, the constrained relative motion between base structure 20 and user-actuated assembly 100 may be about, and in some examples only about, rotary motion axis 72, or a single rotary motion axis 72. Stated yet another way, rotary relative motion between base structure 20 and user-actuated assembly 100 may be about, and in some examples only about, rotary motion axis 72, or the single rotary motion axis 72.

In examples of attachment structures 50 that permit and/or facilitate constrained rotary motion about rotary motion axis 72, the rotary motion axis may extend perpendicular, or at least substantially perpendicular, to the blade rotation plane of circular saw blade 170 and/or may extend parallel, or at least substantially parallel, to shaft rotational axis 154 of motor 150. Attachment structure 50 may include any suitable structure that may be adapted, configured, designed, and/or constructed to permit and/or to facilitate limited rotary motion of user-actuated assembly 100 relative to base structure 20 about rotary motion axis 72. As an example, attachment structure 50 may include a rotary element 70. Examples of rotary element 70 include a pivot and/or a rotary bearing. Rotary element 70 may be configured to permit and/or facilitate limited rotary motion along rotary motion axis 72 between an unpivoted orientation 74, as illustrated in FIGS. 3-5, and a pivoted orientation 76, as illustrated in FIGS. 1-2.

In some examples, attachment structure 50 may be configured to permit constrained relative motion between base structure 20 and user-actuated assembly 100 along linear motion axis 62, as perhaps best illustrated by the transition between FIG. 1 and FIG. 2, or about rotary motion axis 72, as perhaps best illustrated by the transition between FIG. 1 and FIG. 3. Alternatively, in some examples, attachment structure 50 may be configured to permit constrained relative motion between base structure 20 and user-actuated assembly 100 both along linear motion axis 62 and about rotary motion axis 72, as perhaps best illustrated by the transition between FIG. 1 and FIG. 4. In some such examples, motion sensor 110 may be disposed on a circuit board 180 within user-actuated assembly 100. Additionally or alternatively, motion sensor 110 may be disposed on or along linear motion axis 62 and/or on rotary motion axis 72. Motion sensor 110 may be disposed on a user-actuated assembly attached part 61 of linear guide 60, for example the shuttle, or rotary element 70, such as to be only exposed to linear motion. In some such examples, a battery pack may be attached, or attachable, to user-actuated assembly 100 or to the user-actuated assembly attached part of linear guide 60.

In some such examples, motion sensor 110 may be mounted, within user-actuated assembly 100, such that the motion sensor both translates and rotates, with user-actuated assembly 100, relative to base structure 20. In some such examples, linear detection axis 114, such as first linear detection axis 116, may be aligned with linear motion axis 62 when, or only when, user-actuated assembly 100 is in pivoted orientation 76, as illustrated in FIGS. 1-2.

In examples of circular saws 10 where attachment structure 50 permits and/or facilitates the limited rotary motion about rotary motion axis 72, at least one linear detection axis 114 of motion sensor 110 may be spaced apart from rotary motion axis 72. Such a configuration may permit and/or facilitate measurement of rotary motion about rotary motion axis 72 by motion sensor 110. Additionally or alternatively, motion sensor 110 may include a rotary detection axis 120 that may be aligned, or at least substantially aligned, with rotary motion axis 72, such as illustrated in FIGS. 1-4. In some such examples, controller 190 may be programmed to initiate the kickback response if and/or when motion signal 112 indicates that rotary velocity about rotary detection axis 120 is greater than a threshold rotary velocity magnitude. The threshold rotary velocity magnitude may be selected, or predetermined, based on one or more of a number of factors, such as the type of circular saw, the size of circular saw blade, the speed at which the circular saw blade is intended to rotate during operative use of the circular saw, manufacturing considerations, manufacturer and/or operator preferences, etc. As an example, the damper or fluid damper may be coupled to attachment structure 50 and user-actuated assembly 100 to dampen movement in the direction of linear motion axis 62 and about rotary motion axis 72. Controller 190 may be configured to close a valve of the damper or fluid damper to increase resistance to, or damping of, a movement of user-actuated assembly 100 along linear motion axis 62 as the kickback response. As another example, a rotary brake may be disposed on or between attachment structure 50 and user-actuated assembly 100. Controller 190 may be configured to actuate or engage the rotary brake as the kickback response.

As discussed, controller 190 further is programmed to initiate the kickback response of the circular saw responsive to the motion signal being indicative of the kickback condition. In some examples, controller 190 may be programmed to stop and/or to dampen motion of user-actuated assembly 100 about rotary motion axis 72 as the kickback response, such as to decrease, or to decrease a potential for, motion and/or acceleration of user-actuated assembly 100 about the rotary motion axis during the kickback condition. In some such examples, circular saw 10 may include a rotary motion axis braking structure 78, which may be configured to selectively resist, or stop, motion of user-actuated assembly 100 about rotary motion axis 72. In some such examples, controller 190 may be programmed to actuate rotary motion axis braking structure 78 as the kickback response. Examples of rotary motion axis braking structure 78 include any suitable damper, fluid damper, brake, brake pad, and/or friction-enhancing device that may be configured to stop and/or to dampen the motion of the user-actuated assembly about the rotary motion axis.

Circular saws 10, according to the present disclosure, may include and/or be any suitable type and/or class of circular saw that includes base structure 20, user-actuated assembly 100, attachment structure 50, and controller 190 and that is configured such that workpiece support 40 of base structure 20 faces toward user-actuated assembly 100. Examples of circular saws 10 include a stationary circular saw, a semi-stationary circular saw, a miter saw, a compound miter saw, a chop saw, a sliding miter saw, a compound sliding miter saw, a panel saw, a bevel saw, and/or a radial arm saw. In all instances, circular saws 10, according to the present disclosure, are configured such that saw support 30 supports the circular saw and retains base structure 20 fixed, at least substantially fixed, stationary, or at least substantially stationary, during operative use of the circular saw to cut the workpiece. However, and as discussed, user-actuated assembly 100 is configured to move relative to base structure 20 and/or via attachment structure 50 during operative use of the circular saw to cut the workpiece.

As used herein, the phrase "stationary circular saw" refers to circular saws that are configured to be positioned and/or mounted in a fixed location during operative use of the stationary circular saw to cut a workpiece. Such stationary circular saws generally are relatively heavy and are not configured to be readily picked up and/or moved by the user, at least during operative use of the stationary circular saw to cut the workpiece.

As used herein, the phrase "semi-stationary circular saw" refers to semi-portable circular saws that, while typically being lighter than corresponding types of stationary circular saws, still are configured to be positioned and/or selectively mounted in a fixed location during operative use of the stationary circular saw to cut a workpiece. Such semi-stationary circular saws generally are configured to be readily picked up and/or moved by the user, but only prior to and/or after operative use of the stationary circular saw to cut the workpiece. Stated another way, circular saws 10, according to the present disclosure, are not handheld circular saws, namely, circular saws that are configured to be manually held, supported, and moved relative to a workpiece by a user during operative use of the saw.

Miter saws, compound miter saws, chop saws, sliding miter saws, compound sliding miter saws, panel saws, bevel saws, and radial arm saws all include saw supports that are configured to be stationary and to operatively support the circular saw during operative use of the circular saw to cut the workpiece. Stated another way, such circular saws are not configured to be readily picked up and/or moved by the user during operative use of the stationary circular saw to cut the workpiece. Miter saws, compound miter saws, bevel saws, and chop saws generally include rotary element 70 but may not include linear guide 60. Panel saws and radial arm saws generally include linear guide 60 but may not include rotary element 70. Sliding miter saws and sliding compound miter saws generally include both linear guide 60 and rotary element 70. Compound saws, such as compound miter saws, compound sliding miter saws, and/or bevel saws generally are configured to cut compound (i.e., multi-directional) angles within the workpiece.

Base structure 20 may include any suitable structure that may include and/or define saw support 30 and workpiece support 40. Examples of base structure 20 include a metallic base structure 20, a polymeric base structure 20, a monolithic base structure 20, a unitary base structure 20, and/or an assembly of components that defines base structure 20.

Saw support 30 may be configured to support, or to operatively support, circular saw 10 during operative use of the circular saw to cut the workpiece. This support may permit base structure 20 to be stationary, or at least substantially stationary, during operative use of the circular saw to cut the workpiece.

In some examples, saw support 30 includes and/or defines a saw support surface 32, which may be configured to rest against and/or on another object, such as a table, a stand, the floor, and/or the ground surface, during operative use of the circular saw to cut the workpiece. Stated another way, saw support 30 may be configured to directly and/or indirectly be supported by the ground surface and/or may not be configured to be moved, supported, and/or lifted by the user during operative use of the circular saw to cut the workpiece.

In some such examples, saw support surface 32 may include and/or be a horizontal, or at least substantially horizontal, saw support surface 32, at least during operative use of the circular saw to cut the workpiece. In some such examples, saw support surface 32 may face downward, or at least substantially downward, at least during operative use of the circular saw to cut the workpiece. Examples of saw support 30 include a stand and/or a lower surface of base structure 20.

Workpiece support 40 may be configured to support, or to operatively support, workpiece 90 during operative use of the circular saw to cut the workpiece. This may be accomplished in any suitable manner. As an example, workpiece support 40 may have and/or define a workpiece support surface 42, which may be defined on an upper surface of base structure 20. In some such examples, workpiece 90 may be positioned on workpiece support surface 42 during operative use of the circular saw to cut the workpiece. In some such examples, workpiece support surface 42 may face toward user-actuated assembly 100 during operative use of the circular saw to cut the workpiece and/or be configured to support the workpiece between the workpiece support and the user-actuated assembly.

In some such examples, workpiece support surface 42 may include and/or be a horizontal, or at least substantially horizontal, workpiece support surface 42. In some such examples, workpiece support surface 42 may face upward, or at least substantially upward. In some such examples, workpiece support surface 42 may oppose saw support surface 32 and/or may be parallel, or at least substantially parallel, to saw support surface 32.

User-actuated assembly 100 may include any suitable structure that may be operatively attached to base structure 20 via attachment structure 50. Additionally or alternatively, user-actuated assembly 100 may include any suitable structure that includes motion sensor 110, that includes motor 150, that includes arbor 160, and/or that may be configured to receive circular saw blade 170 and/or to provide the rotational motive force for rotation of the circular saw blade within the blade rotation plane.

Motion sensor 110 may include any suitable structure that may be adapted, configured, designed, and/or constructed to detect motion of user-actuated assembly 100 along and/or about the motion direction and/or to generate motion signal 112. As an example, motion sensor 110 may include and/or be a micro-electro-mechanical systems (MEMS) motion sensor. Motion sensor 110 may be configured to detect acceleration along a single detection axis, along two perpendicular detection axes, and/or along three orthogonal detection axes. Additionally or alternatively, motion sensor 110 may be configured to detect rotation about the single detection axis, about two perpendicular detection axes, and/or about three orthogonal detection axes. In a specific example, motion sensor 110 may be configured to detect acceleration within an acceleration detection plane that is perpendicular to shaft rotational axis 154 and/or that is parallel to the blade rotation plane. In another specific example, motion sensor 110 may be configured to detect rotation about a rotation detection axis that may be parallel to shaft rotational axis 154. Such rotation also may be referred to herein as being detected within a rotation detection plane that is perpendicular to shaft rotational axis 154 and/or that is parallel to the blade rotation plane.

Motor 150 may include any suitable structure that may be adapted, configured, designed, and/or constructed to include motor shaft 152 and/or to rotate the motor shaft about shaft rotational axis 154. Examples of motor 150 include an electric motor, an AC electric motor, a DC electric motor, a brushless DC electric motor, a variable-speed motor, and/or a single-speed motor.

Arbor 160 may include any suitable structure that may be adapted, configured, designed, and/or constructed to operatively attach circular saw blade 170 to motor shaft 152 and/or to rotate the circular saw blade within the blade rotation plane responsive to rotation of the motor shaft. Examples of arbor 160 include a shaft arbor, a flat head arbor, a hex head arbor, a recessed hex arbor, and/or a compression arbor.

Controller 190 may include any suitable structure, device, and/or devices that may be adapted, configured, designed, and/or programmed to receive motion signal 112, to determine that the motion signal is indicative of the kickback condition, and/or to initiate the kickback response of the circular saw responsive to the motion signal being indicative of the kickback condition. As examples, controller 190 may include one or more of an electronic controller, a dedicated controller, a special-purpose controller, a display device, a logic device, a memory device, and/or a memory device having computer-readable storage media.

The computer-readable storage media, when present, also may be referred to herein as non-transitory computer-readable storage media. This non-transitory computer-readable storage media may include, define, house, and/or store computer-executable instructions, programs, and/or code; and these computer-executable instructions may instruct circular saw 10 and/or controller 190 thereof to perform any suitable portion, or subset, of methods 200. Examples of such non-transitory computer-readable storage media include CD-ROMs, disks, hard drives, flash memory, etc. As used herein, storage, or memory, devices and/or media having computer-executable instructions, as well as computer-implemented methods and other methods according to the present disclosure, are considered to be within the scope of subject matter deemed patentable in accordance with Section 101 of Title 35 of the United States Code.

In some examples, user-actuated assembly 100 may include a circuit board 180, as illustrated in FIGS. 1-4. Circuit board 180, when present, may include and/or may define controller 190 and/or motion sensor 110. Additionally or alternatively, controller 190 may be otherwise incorporated within and/or operatively attached to user-actuated assembly 100.

As discussed, controller 190 is programmed to initiate, or to selectively initiate, the kickback response of the circular saw responsive to motion signal 112 being indicative of the kickback condition. It is within the scope of the present disclosure that controller 190 may initiate any suitable kickback response. As an example, controller 190 may be programmed to cease supply of electric current to motor 150 and/or short circuit or short to ground stator coils of motor 150 as the kickback response.

As another example, controller 190 may be programmed to cease and/or to stop rotation of circular saw blade 170 and/or of motor 150 as the kickback response. As a more specific example, circular saw 10 and/or user-actuated assembly 100 thereof may include a brake assembly 80, which may be configured to selectively resist and/or stop rotation of circular saw blade 170. In some such examples, controller 190 is programmed to actuate brake assembly 80 as the kickback response. Examples of brake assembly 80 include a mechanical brake assembly, a brake pad, a brake actuator, and/or a brake cam, which may be configured to selectively engage with, and frictionally resist motion of, circular saw blade 170 and/or motor shaft 152. Another example of brake assembly 80 includes an electric brake of motor 150, such as a counter-field brake.

As yet another example, controller 190 may be programmed to cease motion of user-actuated assembly 100 along linear motion axis 62, such as via actuation of linear motion axis braking structure 68. As another example, controller 190 may be programmed to cease rotation of user-actuated assembly 100 about rotary motion axis 72, such as via actuation of rotary motion axis braking structure 78.

In some examples, controller 190 may be programmed to determine a workpiece contact parameter, which may be indicative of contact, or physical contact, between the circular saw blade and the workpiece. In some such examples, the controller further may be programmed to initiate the kickback response of the circular saw when, or only when, the workpiece contact parameter indicates that the circular saw is in contact with the workpiece and the motion signal is indicative of the kickback condition. Such a configuration may decrease a potential for false, or undesired, initiation of the kickback response during situations in which the motion signal might be indicative of the kickback condition but the circular saw is not being utilized to cut the workpiece. Stated another way, it may be undesirable to initiate the kickback response if the circular saw is bumped, jarred, or moved quickly during times when the circular saw is not actively being utilized to cut the workpiece, and the controller may utilize the workpiece contact parameter to avoid such undesired initiation of the kickback response. Examples of the workpiece contact parameter are disclosed herein with reference to methods 200.

Circular saws 10 may include other, or additional, components, which may be included in conventional circular saws. As an example, and as illustrated in dashed lines in FIGS. 1-4, circular saws 10 and/or user-actuated assemblies 100 thereof may include a gripping region 130. Gripping region 130, when present, may be configured to be held and/or gripped by the user of the circular saw during operative use of the circular saw to cut the workpiece. As an example, the user may urge circular saw blade 170 into contact with workpiece 90 with, via, and/or utilizing gripping region 130.

As another example, and as also illustrated in dashed lines in FIGS. 1-4, circular saws 10 and/or user-actuated assemblies 100 thereof may include a switch 140. Switch 140, when present, may be configured to be selectively actuated by the user, such as to selectively apply an electric current to at least one other component of the circular saw. In a specific example, actuation of switch 140 may cause circular saw 10 to rotate circular saw blade 170 within the blade rotation plane.

As yet another example, and as also illustrated in dashed lines in FIGS. 1-4, circular saws 10 may include a power source 185. Power source 185, when present, may be adapted, configured, designed, and/or constructed to power, or to electrically power, at least one other component of circular saws 10, such as motor 150 and/or controller 190. Examples of power source 185 include any suitable AC power source, DC power source, power cord, and/or battery.

Figure 9:
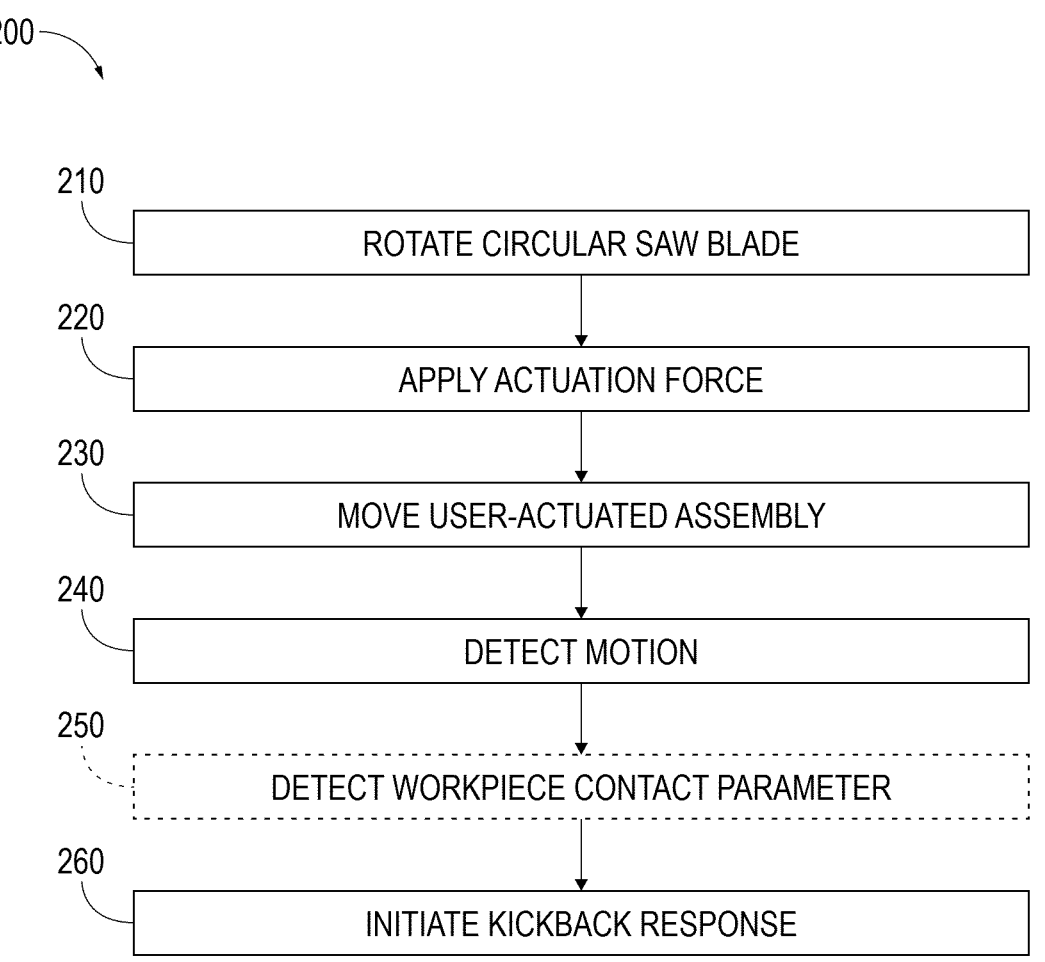
FIG. 9 is a flowchart illustrating examples of methods of detecting a kickback condition of a circular saw that includes a circular saw blade, according to the present disclosure.

FIG. 9 is a flowchart illustrating examples of methods 200 of detecting a kickback condition of a circular saw that includes a circular saw blade, according to the present disclosure. Examples of the circular saw are disclosed herein with reference to circular saws 10 of FIGS. 1-4. Examples of the kickback condition also are disclosed herein.

Methods 200 include rotating the circular saw blade at 210 and applying an actuation force at 220. Methods 200 also include moving a user-actuated assembly at 230 and detecting motion at 240. Methods 200 may include detecting a workpiece contact parameter at 250 and include initiating a kickback response at 260.

Rotating the circular saw blade at 210 may include rotating the circular saw blade within a blade rotation plane. This may include rotating the circular saw blade to permit and/or to facilitate cutting of the workpiece, such as may be during and/or responsive to the moving at 230. Examples of the blade rotation plane are disclosed herein.

The rotating at 210 may be accomplished in any suitable manner. As an example, the rotating at 210 may include applying an electric current to a motor of the circular saw. Responsive to the applying, the motor may provide a rotational motive force to the circular saw blade, which may produce and/or generate the rotating at 210. As another example, the rotating at 210 may include actuating a switch of the circular saw to apply the electric current to the motor, with the rotating at 210 being responsive to actuation of the switch. Examples of the motor are disclosed herein with reference to motor 150. Examples of the switch are disclosed herein with reference to switch 140.

The rotating at 210 may be performed with any suitable timing and/or sequence during methods 200. As examples, the rotating at 210 may be performed prior to and/or at least partially concurrently with the applying at 220, the moving at 230, the detecting at 240, the detecting at 250, and/or the initiating at 260.

Applying the actuation force at 220 may include applying the actuation force to the user-actuated assembly of the circular saw. This may include applying the actuation force to permit, to facilitate, and/or to produce the moving at 230. In some examples, the applying at 220 may be performed by a user of the circular saw. Stated another way, the actuation force may be applied by the user of the circular saw, such as to a gripping region of the circular saw. Examples of the user-actuated assembly are disclosed herein with reference to user-actuated assembly 100 of FIGS. 1-4. Examples of the gripping region are disclosed herein with reference to gripping region 130.

The applying at 220 may be performed with any suitable timing and/or sequence during methods 220. As examples, the applying at 220 may be performed subsequent to and/or at least partially concurrently with the rotating at 210. As additional examples, the applying at 220 may be performed prior to and/or at least partially concurrently with the moving at 230, the detecting at 240, the detecting at 250, and/or the initiating at 260. In a specific example, the applying at 220 may be performed prior to initiation of the rotating at 210. In some such examples, subsequent initiation of the rotating at 210 may produce and/or generate a kickback condition of the circular saw. Examples of the kickback condition are disclosed herein.

Moving the user-actuated assembly at 230 may include moving the user-actuated assembly in a motion direction relative to a base structure of the circular saw. The moving at 230 may be performed with any suitable timing and/or sequence during methods 200. As an example, the moving at 230 may be performed subsequent to and/or at least partially concurrently with the rotating at 210. As additional examples, the moving at 230 may be performed subsequent to, at least partially concurrently with, and/or at least partially responsive to the applying at 220. As further examples, the moving at 230 may be performed prior to and/or at least partially concurrently with the detecting at 240, the detecting at 250, and/or the initiating at 260. In a specific example, the moving at 230 may be performed prior to initiation of the rotating at 210. In some such examples, subsequent initiation of the rotating at 210 may produce and/or generate the kickback condition of the circular saw.

In some examples, the moving at 230 may include translating the user-actuated assembly along a, or along a single, linear motion axis. In some such examples, the linear motion axis may be parallel, or at least substantially parallel, to the blade rotation plane. Examples of the linear motion axis are disclosed herein with reference to linear motion axis 62.

In some examples, the moving at 230 may include rotating the user-actuated assembly about a, or about a single, rotary motion axis. In some such examples, the rotary motion axis may extend perpendicular, or at least substantially perpendicular, to the blade rotation plane. Examples of the rotary motion axis are disclosed herein with reference to rotary motion axis 72.

Detecting motion at 240 may include detecting motion of the user-actuated assembly along the motion direction. Additionally or alternatively, the detecting at 240 may include detecting motion with, via, and/or utilizing a motion sensor of the user-actuated assembly. Examples of the motion sensor are disclosed herein with reference to motion sensor 110.

In examples of methods 200 where the moving at 230 includes translating the user-actuated assembly along the linear motion axis, the detecting at 240 may include detecting linear acceleration of the user-actuated assembly along the linear detection axis. As discussed in more detail herein, the linear motion axis may extend toward and/or away from the user during operative use of the circular saw to cut the workpiece. With this in mind, and in some examples, the detecting at 230 may include detecting linear acceleration of the user-actuated assembly toward the user of the circular saw. In examples of methods 200 where the moving at 230 includes rotating the user-actuated assembly about the rotary motion axis, the detecting at 240 may include detecting a rotary velocity of the user-actuated assembly about the rotary motion axis.

The detecting at 240 may be performed with any suitable timing and/or sequence during methods 200. As examples, the detecting at 240 may be performed prior to, subsequent to, and/or at least partially concurrently with the rotating at 210, the applying at 220, the moving at 230, the detecting at 250, and/or the initiating at 260.

Detecting the workpiece contact parameter at 250 may include detecting any suitable workpiece contact parameter that may be indicative of contact between the circular saw blade and the workpiece. Stated another way, and when the circular saw blade is in contact with the workpiece, the workpiece contact parameter may be within a contact value range. In contrast, and when the circular saw blade is spaced apart from, or not in contact with, the workpiece, the workpiece contact parameter may be within a no-contact value range, which may differ from the contact value range. In such configurations, the initiating at 260 may include initiating the kickback response when, or only when, the workpiece contact parameter is within the contact value range. Stated another way, and when methods 200 include the detecting at 250, the workpiece contact parameter having a value that is within the contact value range may be a precondition that must be met prior to the initiating at 260.

In some examples, the workpiece contact parameter may include and/or be an angular velocity of the circular saw blade, revolutions per minute of the circular saw blade, an angular velocity of the motor shaft, and/or revolutions per minute of the motor shaft during the rotating at 210. In such a configuration, and when the circular saw blade is spaced apart from the workpiece and/or when the workpiece is not applying a load to the motor, the circular saw blade may define an average free angular velocity, and the contact value range may include angular velocities that are a threshold angular velocity decrease below the average free angular velocity. Examples of the threshold angular velocity decrease include decreases of at least 20 revolutions per minute (RPM), at least 25 RPM, at least 30 RPM, at least 35 RPM, at least 40 RPM, at least 50 RPM, at least 60 RPM, at least 70 RPM, at least 80 RPM, at least 90 RPM, at least 100 RPM, at least 150 RPM, at least 200 RPM, at least 300 RPM, at least 400 RPM, at least 500 RPM, at least 600 RPM, at least 700 RPM, or at least 800 RPM.

Stated another way, contact between the circular saw blade and the workpiece may generate resistance to rotation of the circular saw blade, thereby lowering the angular velocity of the circular saw blade to a value that is less than the average free angular velocity of the circular saw blade. In addition, and as discussed, the kickback condition may occur as a result of binding and/or pinching of the circular saw blade by the workpiece. This binding and/or pinching further may decrease the angular velocity of the circular saw blade when compared to the average free angular velocity; and this decrease in the angular velocity of the circular saw blade may be utilized to indicate that the circular saw blade is, indeed, in contact with the workpiece.

In such examples, the detecting at 250 may include detecting the angular velocity of the circular saw blade and may be accomplished in any suitable manner. As an example, the detecting the angular velocity of the circular saw blade may include measuring the angular velocity of the circular saw blade, such as via utilizing a rotation counter of the circular saw. As another example, the detecting the angular velocity of the circular saw blade may include calculating the angular velocity of the circular saw blade, such as may be based, at least in part, on a motor model of the motor of the circular saw. In some such examples, the calculating the angular velocity of the circular saw blade may include calculating based, at least in part, on a magnitude of an electric current provided to the motor and/or on a magnitude of a voltage of the electric current.

In some examples, the workpiece contact parameter may include and/or be a power consumption of the circular saw blade during the rotating at 210. In such a configuration, the motor may define a maximum rated power consumption, and the contact value range may include a power consumption that is greater than a threshold percentage of the maximum rated power consumption. Examples of the threshold percentage of the maximum rated power consumption include percentages of, or of at least, 50%, 60%, 70%, 80%, or 90%.

Stated another way, contact between the circular saw blade and the workpiece may generate resistance to rotation of the circular saw blade, thereby increasing power consumption of the motor. In addition, and as discussed, the kickback condition may occur as a result of binding and/or pinching of the circular saw blade by the workpiece. This binding and/or pinching further may increase power consumption of the motor; and this power consumption increase may be utilized to indicate that the circular saw blade is, indeed, in contact with the workpiece.

In such examples, the detecting at 250 may include detecting the power consumption of the motor and may be accomplished in any suitable manner. As an example, the detecting the power consumption of the motor may include calculating the power consumption of the motor based, at least in part, on the magnitude of the electric current provided to the motor and on the magnitude of the voltage of the electric current.

In some examples, the circular saw may include a contact detector, which may be configured to detect contact between the circular saw blade and the workpiece. In some such examples, the contact detector may be configured to produce and/or generate the workpiece contact parameter. Examples of the contact detector include an electrical contact detector, a capacitive contact detector, an electromagnetic contact detector, and/or a mechanical contact detector.

In some examples, the workpiece contact parameter may include and/or may be based, at least in part, on a signal-to-noise ratio of a motion signal that is generated based, at least in part, on the detecting at 240. As an example, the signal-to-noise ratio of the motion signal may decrease when the circular saw blade is in contact with the workpiece compared to when the circular saw blade is not in contact with the workpiece. This is illustrated in FIGS. 6-8, where noise within the motion signal is relatively lower prior to contact between the circular saw blade and the workpiece, as shown for times prior to the time interval that is indicated at 99. In contrast, the noise within the motion signal is relatively higher subsequent to contact between the circular saw blade and the workpiece, as shown for times indicated at 99.

In some examples, the workpiece contact parameter may be based, at least in part, on a magnitude of acceleration of the user-actuated assembly measured during the detecting at 240. In some examples, the workpiece contact parameter may be based, at least in part, on a velocity of the user-actuated assembly in the motion direction and/or on a direction, or a vector orientation, of the motion direction.

Initiating the kickback response at 260 may include initiating the kickback response of the circular saw responsive to the motion of the user-actuated assembly being indicative of the kickback condition of the circular saw. In some examples, the initiating at 260 includes ceasing the rotating at 210. In some such examples, the circular saw may include a brake assembly configured to be selectively actuated to stop rotation of the circular saw blade. In some such examples, the initiating at 260 may include actuating the brake assembly to stop rotation of the circular saw blade. Examples of the brake assembly are disclosed herein with reference to brake assembly 80. In some examples, the initiating at 260 may include ceasing supply of the electric current to the motor of the circular saw.

In examples of methods 200 where the moving at 230 includes translating the user-actuated assembly along the linear motion axis and/or where the detecting at 240 includes detecting linear acceleration of the user-actuated assembly along the linear detection axis, the initiating at 260 may include initiating the kickback response when the linear acceleration is greater than a threshold linear acceleration magnitude. In some such examples, the initiating at 260 may include ceasing motion of the user-actuated assembly along the linear motion axis and/or damping motion of the user-actuated assembly along the linear motion axis, such as utilizing a linear motion axis braking structure of the circular saw. Examples of the linear motion axis braking structure are disclosed herein with reference to linear motion axis braking structure 68.

In some such examples, the linear detection axis may be a first linear detection axis, and the motion sensor also may include a second linear detection axis. The second linear detection axis may be perpendicular to the first linear detection axis, may be aligned with gravity, may be perpendicular to a horizontal direction, and/or may be parallel to the workpiece support. Examples of the first linear detection axis are disclosed herein with reference to first linear detection axis 116. Examples of the second linear detection axis are disclosed herein with reference to second linear detection axis 118. In such a configuration, the initiating at 260 may include initiating the kickback response when a vector sum of the linear acceleration along the first linear detection axis and the linear acceleration along the second linear acceleration axis is greater than the threshold linear acceleration magnitude. Additionally or alternatively, the initiating at 260 may include initiating the kickback response when a scalar sum of an absolute value of the linear acceleration along the first linear detection axis and an absolute value of linear acceleration along the second linear detection axis is greater than the threshold linear acceleration magnitude. Examples of scalar sums of the absolute value of the linear acceleration for which the kickback response may be initiated include accelerations of greater than 5 meters per second squared ($m/s^2$), greater than 8 $m/s^2$, greater than 10 $m/s^2$, greater than 15 $m/s^2$, and greater than 20 $m/s^2$.

In examples of methods 200 where the moving at 230 includes rotating the user-actuated assembly about the rotary motion axis, and/or where the detecting at 240 includes detecting the rotary velocity of the user-actuated assembly about the rotary detection axis, the initiating at 260 may include initiating the kickback response when the rotary velocity is greater than a threshold rotary velocity magnitude. Additionally or alternatively, the initiating at 260 may include ceasing motion of the user-actuated assembly about the rotary motion axis and/or dampening motion of the user-actuated assembly about the rotary motion axis, such as utilizing a rotary motion braking structure of the circular saw. Examples of the rotary motion braking structure are disclosed herein with reference to rotary motion axis braking structure 78.

In the present disclosure, several of the illustrative, non-exclusive examples have been discussed and/or presented in the context of flow diagrams, or flow charts, in which the methods are shown and described as a series of blocks, or steps. Unless specifically set forth in the accompanying description, it is within the scope of the present disclosure that the order of the blocks may vary from the illustrated order in the flow diagram, including with two or more of the blocks (or steps) occurring in a different order and/or concurrently. It is also within the scope of the present disclosure that one or more of the blocks, or steps, may be implemented as logic, which also may be described as implementing the blocks, or steps, as logics. In some applications, the blocks, or steps, may represent expressions and/or actions to be performed by functionally equivalent circuits or other logic devices. The illustrated blocks may, but are not required to, represent executable instructions that cause a computer, processor, and/or other logic device to respond, to perform an action, to change states, to generate an output or display, and/or to make decisions.

As used herein, the term "and/or" placed between a first entity and a second entity means one of (1) the first entity, (2) the second entity, and (3) the first entity and the second entity. Multiple entities listed with "and/or" should be construed in the same manner, i.e., "one or more" of the entities so conjoined. Other entities may optionally be present other than the entities specifically identified by the "and/or" clause, whether related or unrelated to those entities specifically identified. Thus, as a non-limiting example, a reference to "A and/or B," when used in conjunction with open-ended language such as "comprising" may refer, in one embodiment, to A only (optionally including entities other than B); in another embodiment, to B only (optionally including entities other than A); in yet another embodiment, to both A and B (optionally including other entities). These entities may refer to elements, actions, structures, steps, operations, values, and the like.

As used herein, the phrase "at least one," in reference to a list of one or more entities should be understood to mean at least one entity selected from any one or more of the entities in the list of entities, but not necessarily including at least one of each and every entity specifically listed within the list of entities and not excluding any combinations of entities in the list of entities. This definition also allows that entities may optionally be present other than the entities specifically identified within the list of entities to which the phrase "at least one" refers, whether related or unrelated to those entities specifically identified. Thus, as a non-limiting example, "at least one of A and B" (or, equivalently, "at least one of A or B," or, equivalently "at least one of A and/or B") may refer, in one embodiment, to at least one, optionally including more than one, A, with no B present (and optionally including entities other than B); in another embodiment, to at least one, optionally including more than one, B, with no A present (and optionally including entities other than A); in yet another embodiment, to at least one, optionally including more than one, A, and at least one, optionally including more than one, B (and optionally including other entities). In other words, the phrases "at least one," "one or more," and "and/or" are open-ended expressions that are both conjunctive and disjunctive in operation. For example, each of the expressions "at least one of A, B, and C," "at least one of A, B, or C," "one or more of A, B, and C," "one or more of A, B, or C," and "A, B, and/or C" may mean A alone, B alone, C alone, A and B together, A and C together, B and C together, A, B, and C together, and optionally any of the above in combination with at least one other entity.

In the event that any patents, patent applications, or other references are incorporated by reference herein and (1) define a term in a manner that is inconsistent with and/or (2) are otherwise inconsistent with, either the non-incorporated portion of the present disclosure or any of the other incorporated references, the non-incorporated portion of the present disclosure shall control, and the term or incorporated disclosure therein shall only control with respect to the reference in which the term is defined and/or the incorporated disclosure was present originally.

As used herein the terms "adapted" and "configured" mean that the element, component, or other subject matter is designed and/or intended to perform a given function. Thus, the use of the terms "adapted" and "configured" should not be construed to mean that a given element, component, or other subject matter is simply "capable of" performing a given function but that the element, component, and/or other subject matter is specifically selected, created, implemented, utilized, programmed, and/or designed for the purpose of performing the function. It is also within the scope of the present disclosure that elements, components, and/or other recited subject matter that is recited as being adapted to perform a particular function may additionally or alternatively be described as being configured to perform that function, and vice versa.

As used herein, the phrase, "for example," the phrase, "as an example," and/or simply the term "example," when used with reference to one or more components, features, details, structures, embodiments, and/or methods according to the present disclosure, are intended to convey that the described component, feature, detail, structure, embodiment, and/or method is an illustrative, non-exclusive example of components, features, details, structures, embodiments, and/or methods according to the present disclosure. Thus, the described component, feature, detail, structure, embodiment, and/or method is not intended to be limiting, required, or exclusive/exhaustive; and other components, features, details, structures, embodiments, and/or methods, including structurally and/or functionally similar and/or equivalent components, features, details, structures, embodiments, and/or methods, are also within the scope of the present disclosure.

As used herein, "at least substantially," when modifying a degree or relationship, may include not only the recited "substantial" degree or relationship, but also the full extent of the recited degree or relationship. A substantial amount of a recited degree or relationship may include at least 75% of the recited degree or relationship. For example, an object that is at least substantially formed from a material includes objects for which at least 75% of the objects are formed from the material and also includes objects that are completely formed from the material. As another example, a first length that is at least substantially as long as a second length includes first lengths that are within 75% of the second length and also includes first lengths that are as long as the second length.

Illustrative, non-exclusive examples of circular saws and methods according to the present disclosure are presented in the following enumerated paragraphs. It is within the scope of the present disclosure that an individual step of a method recited herein, including in the following enumerated paragraphs, may additionally or alternatively be referred to as a "step for" performing the recited action.

A1. A circular saw having a blade that moves relative to a stationary base during operative use of the circular saw to cut a workpiece, the circular saw comprising:

a base structure including a saw support and a workpiece support;

a user-actuated assembly including a motor, an arbor, and a motion sensor, wherein the motor includes a motor shaft configured to rotate about a shaft rotational axis, and further wherein the arbor is operatively attached to the motor shaft and is configured to receive a circular saw blade and to rotate the circular saw within a blade rotation plane;

an attachment structure, wherein the user-actuated assembly is operatively attached to the base structure via the attachment structure such that the workpiece support faces toward the user-actuated assembly, and further wherein the attachment structure is configured to permit constrained relative motion between the base structure and the user-actuated assembly in a motion direction and during operative use of the circular saw to cut the workpiece; and a controller, wherein the motion sensor is configured to detect motion of the user-actuated assembly along the motion direction and to generate a motion signal indicative of the motion of the user-actuated assembly along the motion direction, and further wherein the controller is programmed to receive the motion signal and to initiate a kickback response of the circular saw responsive to the motion signal being indicative of a kickback condition of the circular saw.

A2. The circular saw of paragraph A1, wherein the attachment structure is configured to permit the constrained relative motion between the base structure and the user-actuated assembly responsive to receipt of an actuation force from a user of the circular saw.

A3. The circular saw of any of paragraphs A1-A2, wherein the motion direction includes, or is, a, or a single, linear motion component.

A4. The circular saw of paragraph A3, wherein the linear motion component is along a, or a single, linear motion axis.

A5. The circular saw of paragraph A4, wherein the linear motion axis is parallel, or at least substantially parallel, to the blade rotation plane.

A6. The circular saw of any of paragraphs A4-A5, wherein the attachment structure includes a linear guide configured to facilitate limited linear motion of the user-actuated assembly relative to the base structure along the linear motion axis.

A7. The circular saw of paragraph A6, wherein the linear guide is configured to permit the limited linear motion of the user-actuated assembly, relative to the base structure, between a retracted orientation and an extended orientation.

A8. The circular saw of any of paragraphs A4-A7, wherein the motion sensor includes a linear detection axis that is aligned, or at least substantially aligned, with the linear motion axis.

A9. The circular saw of paragraph A8, wherein the controller is programmed to initiate the kickback response when the motion signal indicates that linear acceleration along the linear detection axis is greater than a threshold linear acceleration magnitude.

A10. The circular saw of any of paragraphs A8-A9, wherein the linear detection axis is a first linear detection axis, and further wherein the motion sensor includes a second linear detection axis that is at least one of:

(i) perpendicular, or at least substantially perpendicular, to the first linear detection axis;

(ii) aligned, or at least substantially aligned, with gravity;

(iii) perpendicular, or at least substantially perpendicular, to a horizontal direction; and (iv) parallel, or at least substantially parallel, to the workpiece.

A11. The circular saw of paragraph A10, wherein the controller is programmed to initiate the kickback response when the motion signal indicates that at least one of:

(i) a vector sum of linear acceleration along the first linear detection axis and linear acceleration along the second linear detection axis is greater than a/the threshold linear acceleration magnitude; and (ii) a scalar sum of an absolute value of linear acceleration along the first linear detection axis and an absolute value of linear acceleration along the second linear detection axis is greater than a/the threshold linear acceleration magnitude.

A12. The circular saw of any of paragraphs A4-A11, wherein the controller is programmed to at least one of:

(i) stop motion of the user-actuated assembly along the linear motion axis as the kickback response; and (ii) dampen motion of the user-actuated assembly along the linear motion axis as the kickback response.

A13. The circular saw of any of paragraphs A4-A11, wherein the circular saw includes a linear motion axis braking structure configured to selectively resist motion of the user-actuated assembly along the linear motion axis, and further wherein the controller is programmed to actuate the linear motion axis braking structure as the kickback response.

A14. The circular saw of any of paragraphs A1-A13, wherein the motion direction includes, or is, a, or a single, rotary motion component.

A15. The circular saw of paragraph A14, wherein the rotary motion component is about a rotary motion axis.

A16. The circular saw of paragraph A15, wherein the rotary motion axis is perpendicular, or at least substantially perpendicular, to the blade rotation plane.

A17. The circular saw of any of paragraphs A15-A16, wherein the attachment structure includes a rotary element configured to facilitate limited rotary motion of the user-actuated assembly, relative to the base structure, about the rotary motion axis.

A18. The circular saw of paragraph A17, wherein the rotary element is configured to permit the limited rotary motion of the user-actuated assembly, relative to the base structure, between an unpivoted orientation and a pivoted orientation.

A19. The circular saw of paragraph A18, when dependent from any of paragraphs A8-A11, wherein the linear detection axis is aligned with the linear motion axis when the user-actuated assembly is in the pivoted orientation.

A20. The circular saw of any of paragraphs A15-A19, wherein a/the linear detection axis of the motion sensor is spaced apart from the rotary motion axis.

A21. The circular saw of any of paragraphs A15-A20, wherein the motion sensor includes a rotary detection axis that is aligned, or at least substantially aligned, with the rotary motion axis.

A22. The circular saw of paragraph A21, wherein the controller is programmed to initiate the kickback response when the motion signal indicates that a velocity about the rotary detection axis is greater than a threshold rotary velocity magnitude.

A23. The circular saw of any of paragraphs A15-A22, wherein the controller is programmed to at least one of:

(i) stop motion of the user-actuated assembly about the rotary motion axis as the kickback response; and (ii) dampen motion of the user-actuated assembly about the rotary motion axis as the kickback response.

A24. The circular saw of any of paragraphs A15-A23, wherein the circular saw includes a rotary motion axis braking structure configured to selectively resist motion of the user-actuated assembly about the rotary motion axis, and further wherein the controller is programmed to actuate the rotary motion axis braking structure as the kickback response.

A25. The circular saw of any of paragraphs A1-A24, wherein the circular saw includes at least one of a stationary circular saw, a semi-stationary circular saw, a miter saw, a compound miter saw, a chop saw, a sliding miter saw, a compound sliding miter saw, a panel saw, a bevel saw, and a radial arm saw.

A26. The circular saw of any of paragraphs A1-A25, wherein the circular saw is not a handheld circular saw.

A27. The circular saw of any of paragraphs A1-A26, wherein the saw support is configured to support the circular saw during operative use of the circular saw to cut the workpiece.

A28. The circular saw of any of paragraphs A1-A27, wherein the saw support defines a saw support surface.

A29. The circular saw of paragraph A28, wherein the saw support surface is a horizontal, or at least substantially horizontal, saw support surface.

A30. The circular saw of any of paragraphs A28-A29, wherein the saw support surface faces downward, or at least substantially downward.

A31. The circular saw of any of paragraphs A1-A30, wherein at least one of:

(i) the saw support is configured to be directly supported by a ground surface during operative use of the circular saw to cut the workpiece;

(ii) the saw support is configured to be indirectly supported by the ground surface during operative use of the circular saw to cut the workpiece; and (iii) the saw support is not configured to be moved by a/the user during operative use of the circular saw to cut the workpiece.

A32. The circular saw of any of paragraphs A1-A31, wherein the workpiece support defines a workpiece support surface configured to support the workpiece during operative use of the circular saw to cut the workpiece.

A33. The circular saw of paragraph A32, wherein the workpiece support surface is a horizontal, or at least substantially horizontal, workpiece support surface.

A34. The circular saw of any of paragraphs A32-A33, wherein the workpiece support surface faces upward, or at least substantially upward.

A35. The circular saw of any of paragraphs A32-A34, wherein the workpiece support surface is at least one of:

(i) opposed to a/the saw support surface;

(ii) parallel to the saw support surface; and (iii) at least substantially parallel to the saw support surface.

A36. The circular saw of any of paragraphs A1-A35, wherein the motion sensor includes, or is, a micro-electro-mechanical system (MEMS) motion sensor.

A37. The circular saw of any of paragraphs A1-A36, wherein the motion sensor is configured to at least one of:

(i) detect acceleration along a single detection axis;

(ii) detect acceleration along two perpendicular detection axes;

(iii) detect acceleration along three orthogonal detection axes;

(iv) detect rotation about the single detection axis;

(v) detect rotation about the two perpendicular detection axes; and (vi) detect rotation about the three orthogonal detection axes.

A38. The circular saw of any of paragraphs A1-A37, wherein the motion sensor is configured to detect acceleration within an acceleration detection plane that is at least one of:

(i) perpendicular to the shaft rotational axis; and (ii) parallel to the blade rotation plane.

A39. The circular saw of any of paragraphs A1-A38, wherein the motion sensor is configured to detect rotation within a rotation detection plane that is at least one of:

(i) perpendicular to the shaft rotational axis;

(ii) parallel to the blade rotation plane; and (iii) parallel to a/the acceleration detection plane.

A40. The circular saw of any of paragraphs A1-A39, wherein the user-actuated assembly includes a circuit board that includes both the controller and the motion sensor.

A41. The circular saw of any of paragraphs A1-A40, wherein the user-actuated assembly includes the controller.

A42. The circular saw of any of paragraphs A1-A41, wherein the controller further is programmed to perform any suitable step of any of the methods of any of paragraphs B1-B28.

A43. The circular saw of any of paragraphs A1-A42, wherein the controller is programmed to stop rotation of the circular saw blade as the kickback response.

A44. The circular saw of paragraph A43, wherein the circular saw further includes a brake assembly configured to be selectively actuated to stop rotation of the circular saw blade, and further wherein the controller is programmed to actuate the brake assembly as the kickback response.

A45. The circular saw of any of paragraphs A43-A44, wherein the controller is programmed to cease supply of an electric current to the motor as the kickback response.

A46. The circular saw of any of paragraphs A43-A45, wherein the controller further is programmed to determine a workpiece contact parameter, wherein, when the circular saw blade is in contact with the workpiece, the workpiece contact parameter is within a contact value range, wherein, when the circular saw blade is spaced apart from the workpiece, the workpiece contact parameter is within a no-contact value range, and further wherein the controller is programmed to determine that the kickback condition exists when, or only when, the workpiece contact parameter is within the contact value range.

A47. The circular saw of paragraph A46, wherein the workpiece contact parameter includes an angular velocity of at least one of the motor and the circular saw blade during operative use of the circular saw to cut the workpiece, wherein, when the circular saw blade is spaced apart from the workpiece, the angular velocity defines an average free angular velocity, and further wherein the contact value range includes angular velocities that are a threshold angular velocity decrease below the average free angular velocity, optionally wherein the threshold angular velocity decrease is at least 20 revolutions per minute (RPM), at least 25 RPM, at least 30 RPM, at least 35 RPM, at least 40 RPM, at least 50 RPM, at least 60 RPM, at least 70 RPM, at least 80 RPM, at least 90 RPM, at least 100 RPM, at least 150 RPM, at least 200 RPM, at least 300 RPM, at least 400 RPM, at least 500 RPM, at least 600 RPM, at least 700 RPM, or at least 800 RPM.

A48. The circular saw of paragraph A47, wherein the controller is programmed to measure the angular velocity of the circular saw blade.

A49. The circular saw of any of paragraphs A47-A48, wherein the controller is programmed to calculate the angular velocity of the circular saw blade based, at least in part, on a motor model of the motor.

A50. The circular saw of any of paragraphs A47-A49, wherein the controller is programmed to calculate the angular velocity of the circular saw blade based, at least in part, on a magnitude of an electric current provided to the motor and a magnitude of a voltage of the electric current.

A51. The circular saw of any of paragraphs A46-A50, wherein the workpiece contact parameter includes at least one of an electric current consumption and a power consumption of the circular saw blade during operative use of the circular saw to cut the workpiece, wherein the motor of the circular saw defines a maximum rated consumption, and further wherein the contact value range includes a consumption that is greater than a threshold percentage of the maximum rated consumption, optionally wherein the threshold percentage of the maximum rated consumption is 50%, 60%, 70%, 80%, or 90%.

A52. The circular saw of any of paragraphs A46-A51, wherein the circular saw includes a contact detector configured to detect contact between the circular saw blade and the workpiece, and further wherein the contact detector is configured to generate the workpiece contact parameter.

A53. The circular saw of paragraph A52, wherein the contact detector includes at least one of:

(i) an electrical contact detector;

(ii) a capacitive contact detector;

(iii) an electromagnetic contact detector; and (iv) a mechanical contact detector.

A54. The circular saw of any of paragraphs A46-A53, wherein the workpiece contact parameter is based, at least in part, on a signal-to-noise ratio of the motion signal.

A55. The circular saw of any of paragraphs A46-A54, wherein the workpiece contact parameter is based, at least in part, on a magnitude of acceleration of the user-actuated assembly measured during operative use of the circular saw to cut the workpiece.

A56. The circular saw of any of paragraphs A46-A55, wherein the workpiece contact parameter is based, at least in part, on at least one of:

(i) a velocity of the user-actuated assembly in the motion direction; and (ii) a direction of the motion direction.

A57. The circular saw of any of paragraphs A1-A56, wherein the user-actuated assembly further includes a gripping region configured to be gripped by a/the user of the circular saw to urge the circular saw blade into contact with the workpiece during operation of the circular saw to cut the workpiece.

A58. The circular saw of any of paragraphs A1-A57, wherein the user-actuated assembly further includes a switch configured to be selectively actuated by a/the user to selectively apply an electric current to at least one other component of the circular saw.

A59. The circular saw of any of paragraphs A1-A58, wherein the user-actuated assembly further includes the circular saw blade, wherein the circular saw blade is operatively attached to the motor via the arbor.

B1. A method of detecting a kickback condition of a circular saw that includes a circular saw blade, the method comprising:

rotating the circular saw blade within a blade rotation plane;

applying an actuation force to a user-actuated assembly of the circular saw;

responsive to the applying, moving the user-actuated assembly in a motion direction relative to a base structure of the circular saw;

detecting motion of the user-actuated assembly along the motion direction with a motion sensor of the user-actuated assembly; and initiating a kickback response of the circular saw responsive to the motion of the user-actuated assembly being indicative of a kickback condition of the circular saw.

B2. The method of paragraph B1, wherein the detecting further includes detecting a workpiece contact parameter, wherein, when the circular saw blade is in contact with a workpiece, the workpiece contact parameter is within a contact value range, wherein, when the circular saw blade is spaced apart from the workpiece, the workpiece contact parameter is within a no-contact value range, and further wherein the method includes determining that the kickback condition exists when, or only when, the workpiece contact parameter is within the contact value range.

B3. The method of paragraph B2, wherein the workpiece contact parameter includes an angular velocity of at least one of a motor and the circular saw blade during the rotating, wherein, when the circular saw blade is spaced apart from the workpiece, the angular velocity defines an average free angular velocity, and further wherein the contact value range includes angular velocities that are a threshold angular velocity decrease below the average free angular velocity, optionally wherein the threshold angular velocity decrease is at least 20 revolutions per minute (RPM), at least 25 RPM, at least 30 RPM, at least 35 RPM, at least 40 RPM, at least 50 RPM, at least 60 RPM, at least 70 RPM, at least 80 RPM, at least 90 RPM, at least 100 RPM, at least 150 RPM, at least 200 RPM, at least 300 RPM, at least 400 RPM, at least 500 RPM, at least 600 RPM, at least 700 RPM, or at least 800 RPM.

B4. The method of paragraph B3, wherein the detecting the workpiece contact parameter includes measuring the angular velocity of the circular saw blade.

B5. The method of any of paragraphs B3-B4, wherein the detecting the workpiece contact parameter includes calculating the angular velocity of the circular saw blade based, at least in part, on a motor model of a motor of the circular saw.

B6. The method of paragraph B5, wherein the calculating the angular velocity of the circular saw blade further includes calculating the angular velocity of the circular saw blade based, at least in part, on a magnitude of an electric current provided to the motor and a magnitude of a voltage of the electric current.

B7. The method of any of paragraphs B2-B6, wherein the workpiece contact parameter includes at least one of an electric current consumption and a power consumption of the circular saw blade during the rotating, wherein a/the motor of the circular saw defines a maximum rated consumption, and further wherein the contact value range includes a consumption that is greater than a threshold percentage of the maximum rated consumption, optionally wherein the threshold percentage of the maximum rated consumption is 50%, 60%, 70%, 80%, or 90%.

B8. The method of any of paragraphs B2-B7, wherein the circular saw includes a contact detector configured to detect contact between the circular saw blade and the workpiece, and further wherein the contact detector is configured to generate the workpiece contact parameter.

B9. The method of paragraph B8, wherein the contact detector includes at least one of:
(i) an electrical contact detector;
(ii) a capacitive contact detector;
(iii) an electromagnetic contact detector; and
(iv) a mechanical contact detector.

B10. The method of any of paragraphs B2-B9, wherein the workpiece contact parameter is based, at least in part, on a signal-to-noise ratio of the detecting.

B11. The method of any of paragraphs B2-B10, wherein the workpiece contact parameter is based, at least in part, on a magnitude of acceleration of the user-actuated assembly measured during the detecting.

B12. The method of any of paragraphs B2-B11, wherein the workpiece contact parameter is based, at least in part, on at least one of:
(i) a velocity of the user-actuated assembly in the motion direction; and
(ii) a direction of the motion direction.

B13. The method of any of paragraphs B1-B12, wherein the applying the actuation force is performed by a user of the circular saw.

B14. The method of any of paragraphs B1-B13, wherein the moving the user-actuated assembly includes translating the user-actuated assembly along a, or a single, linear motion axis.

B15. The method of paragraph B14, wherein the linear motion axis is parallel, or at least substantially parallel, to the blade rotation plane.

B16. The method of any of paragraphs B14-B15, wherein the detecting motion includes detecting linear acceleration along a linear detection axis and optionally toward a/the user of the circular saw.

B17. The method of paragraph B16, wherein the initiating the kickback response includes initiating the kickback response when the linear acceleration is greater than a threshold linear acceleration magnitude.

B18. The method of any of paragraphs B16-B17, wherein the linear detection axis is a first linear detection axis, wherein the motion sensor includes a second linear detection axis that is at least one of perpendicular to the first linear detection axis, aligned with gravity, perpendicular to a horizontal direction, and parallel to a workpiece support of the circular saw, and further wherein the initiating the kickback response includes initiating the kickback response when at least one of:
(i) a vector sum of linear acceleration along the first linear detection axis and linear acceleration along the second linear detection axis is greater than a/the threshold linear acceleration magnitude; and
(ii) a scalar sum of an absolute value of linear acceleration along the first linear detection axis and an absolute value of linear acceleration along the second linear detection axis is greater than a/the threshold linear acceleration magnitude.

B19. The method of any of paragraphs B14-B18, wherein the initiating the kickback response includes at least one of:
(i) ceasing motion of the user-actuated assembly along the linear motion axis; and
(ii) dampening motion of the user-actuated assembly along the linear motion axis.

B20. The method of any of paragraphs B1-B19, wherein the moving the user-actuated assembly includes rotating the user-actuated assembly about a, or a single, rotary motion axis.

B21. The method of paragraph B20, wherein the rotary motion axis is perpendicular, or at least substantially perpendicular, to the blade rotation plane.

B22. The method of any of paragraphs B20-B21, wherein the detecting motion includes detecting a rotary velocity about the rotary motion axis.

B23. The method of paragraph B22, wherein the initiating the kickback response includes initiating the kickback response when the rotary velocity is greater than a threshold rotary velocity magnitude.

B24. The method of any of paragraphs B22-B23, wherein the initiating the kickback response includes at least one of:

(i) ceasing motion of the user-actuated assembly about the rotary motion axis; and (ii) dampening motion of the user-actuated assembly about the rotary motion axis.

B25. The method of any of paragraphs B1-B24, wherein the initiating the kickback response includes ceasing the rotating.

B26. The method of any of paragraphs B1-B25, wherein the circular saw includes a brake assembly configured to be selectively actuated to stop rotation of the circular saw blade, and further wherein the initiating the kickback response includes actuating the brake assembly to stop rotation of the circular saw blade.

B27. The method of any of paragraphs B1-B26, wherein the initiating the kickback response includes ceasing supply of an electric current to a motor of the circular saw.

B28. The method of any of paragraphs B1-B27, wherein the circular saw includes any suitable structure of any of the circular saws of any of paragraphs A1-A59.

B29. Non-transitory computer-readable storage media including computer-executable instructions that, when executed, direct a controller of a circular saw to perform any suitable step of any of the methods of any of paragraphs B1-B28.

INDUSTRIAL APPLICABILITY

The circular saws and methods disclosed herein are applicable to the electric power tool industry.

It is believed that the disclosure set forth above encompasses multiple distinct inventions with independent utility. While each of these inventions has been disclosed in its preferred form, the specific embodiments thereof as disclosed and illustrated herein are not to be considered in a limiting sense as numerous variations are possible. The subject matter of the inventions includes all novel and non-obvious combinations and subcombinations of the various elements, features, functions and/or properties disclosed herein. Similarly, where the claims recite "a" or "a first" element or the equivalent thereof, such claims should be understood to include incorporation of one or more such elements, neither requiring nor excluding two or more such elements.

It is believed that the following claims particularly point out certain combinations and subcombinations that are directed to one of the disclosed inventions and are novel and non-obvious.

Inventions embodied in other combinations and subcombinations of features, functions, elements and/or properties may be claimed through amendment of the present claims or presentation of new claims in this or a related application. Such amended or new claims, whether they are directed to a different invention or directed to the same invention, whether different, broader, narrower, or equal in scope to the original claims, are also regarded as included within the subject matter of the inventions of the present disclosure.

The invention claimed is:

1. A circular saw having a circular saw blade that moves relative to a base structure during operative use of the circular saw to cut a workpiece, the circular saw comprising:

the base structure including a saw support and a workpiece support;

a user-actuated assembly including a motor, an arbor, and a motion sensor, wherein the motor includes a motor shaft configured to rotate about a shaft rotational axis, and wherein the arbor is attached to the motor shaft and is configured to receive the circular saw blade and to rotate the circular saw within a blade rotation plane;

an attachment structure, wherein the user-actuated assembly is attached to the base structure via the attachment structure such that the workpiece support faces toward the user-actuated assembly, and wherein the attachment structure is configured to permit constrained relative motion between the base structure and the user-actuated assembly in a motion direction and during operative use of the circular saw to cut the workpiece; and a controller, wherein the motion sensor is configured to detect motion of the user-actuated assembly along the motion direction and to generate a motion signal indicative of the motion of the user-actuated assembly along the motion direction, and wherein the controller is programmed to receive the motion signal and to initiate a kickback response of the circular saw responsive to the motion signal being indicative of a kickback condition of the circular saw, wherein the motion direction includes a single linear motion component that is along a linear motion axis, wherein the attachment structure includes a linear guide configured to facilitate limited linear motion of the user-actuated assembly relative to the base structure along the linear motion axis, wherein the motion sensor includes a linear detection axis that is at least substantially aligned with the linear motion axis, and wherein the controller is programmed to initiate the kickback response when the motion signal indicates that linear acceleration along the linear detection axis is greater than a threshold linear acceleration magnitude.

2. The circular saw of claim 1, wherein the linear detection axis is a first linear detection axis, and wherein the motion sensor includes a second linear detection axis that is at least one of:

(i) at least substantially perpendicular to the first linear detection axis;

(ii) at least substantially aligned with a direction of gravity;

(iii) at least substantially perpendicular to a horizontal direction; and (iv) at least substantially parallel to a workpiece support.

3. The circular saw of claim 1, wherein the circular saw includes a linear motion axis braking structure configured to selectively resist motion of the user-actuated assembly along the linear motion axis, and wherein the controller is programmed to actuate the linear motion axis braking structure as the kickback response.

4. The circular saw of claim 1, wherein the motion direction includes a single rotary motion component that is about a rotary motion axis, and wherein the attachment structure includes a rotary element configured to facilitate limited rotary motion of the user-actuated assembly, relative to the base structure, about the rotary motion axis.

5. The circular saw of claim 4, wherein at least one of:

(i) the motion sensor is disposed on the linear motion axis;

(ii) the motion sensor is disposed on the rotary motion axis;

(iii) the motion sensor is disposed on a user-actuated assembly attached part of the linear guide such that the motion sensor is only exposed to linear motion; and (iv) the motion sensor is disposed on a rotary element such that the motion sensor is only exposed to linear motion.

6. The circular saw of claim 5, wherein a battery pack is attached to at least one of:

(i) the user-actuated assembly; and (ii) the user-actuated assembly attached part of the linear guide.

7. The circular saw of claim 4, wherein the circular saw includes a rotary motion axis braking structure configured to selectively resist motion of the user-actuated assembly about the rotary motion axis, and wherein the controller is programmed to actuate the rotary motion axis braking structure as the kickback response.

8. The circular saw of claim 1, wherein the controller is programmed to stop rotation of the circular saw blade as the kickback response.

9. The circular saw of claim 1, wherein the circular saw includes a brake assembly configured to be selectively actuated to stop rotation of the circular saw blade, and wherein the controller is programmed to actuate the brake assembly as the kickback response.

10. The circular saw of claim 1, wherein the controller is programmed to at least one of:

(i) cease supply of an electric current to the motor as the kickback response;

(ii) short circuit stator coils of the motor as the kickback response; and (iii) short to ground stator coils of the motor as the kickback response.

11. The circular saw of claim 1, wherein the controller is programmed to determine a workpiece contact parameter, wherein, when the circular saw blade is in contact with the workpiece, the workpiece contact parameter is within a contact value range, wherein, when the circular saw blade is spaced apart from the workpiece, the workpiece contact parameter is within a no-contact value range, and wherein the controller is programmed to determine that the kickback condition exists only when the workpiece contact parameter is within the contact value range.

12. The circular saw of claim 11, wherein the workpiece contact parameter includes an angular velocity of at least one of the motor and the circular saw blade during operative use of the circular saw to cut the workpiece, wherein, when the circular saw blade is spaced apart from the workpiece, the angular velocity defines an average free angular velocity, and wherein the contact value range includes angular velocities that are at least 20 revolutions per minute below the average free angular velocity.

13. The circular saw of claim 11, wherein the workpiece contact parameter includes at least one of an electric current consumption and a power consumption of the circular saw blade during operative use of the circular saw to cut the workpiece, wherein the motor of the circular saw defines a maximum rated consumption, and wherein the contact value range includes a consumption that is greater than 50% of the maximum rated consumption.

14. The circular saw of claim 11, wherein the circular saw includes a contact detector configured to detect contact between the circular saw blade and the workpiece, and wherein the contact detector is configured to generate the workpiece contact parameter.

15. A circular saw having a circular saw blade that moves relative to a base structure during operative use of the circular saw to cut a workpiece, the circular saw comprising:

the base structure including a saw support and a workpiece support;

a user-actuated assembly including a motor, an arbor, and a motion sensor, wherein the motor includes a motor shaft configured to rotate about a shaft rotational axis, and wherein the arbor is attached to the motor shaft and is configured to receive the circular saw blade and to rotate the circular saw within a blade rotation plane;

an attachment structure, wherein the user-actuated assembly is attached to the base structure via the attachment structure such that the workpiece support faces toward the user-actuated assembly, and wherein the attachment structure is configured to permit constrained relative motion between the base structure and the user-actuated assembly in a motion direction and during operative use of the circular saw to cut the workpiece; and a controller, wherein the motion sensor is configured to detect motion of the user-actuated assembly along the motion direction and to generate a motion signal indicative of the motion of the user-actuated assembly along the motion direction, wherein the controller is programmed to receive the motion signal and to initiate a kickback response of the circular saw responsive to the motion signal being indicative of a kickback condition of the circular saw, wherein the motion direction includes a single linear motion component that is along a linear motion axis, wherein the attachment structure includes a linear guide configured to facilitate limited linear motion of the user-actuated assembly relative to the base structure along the linear motion axis, wherein the motion sensor includes a linear detection axis that is at least substantially aligned with the linear motion axis, wherein the linear detection axis is a first linear detection axis, wherein the motion sensor includes a second linear detection axis that is at least one of:

(i) at least substantially perpendicular to the first linear detection axis;

(ii) at least substantially aligned with a direction of gravity;

(iii) at least substantially perpendicular to a horizontal direction; and (iv) at least substantially parallel to a workpiece support, and wherein the controller is programmed to initiate the kickback response when the motion signal indicates that at least one of:

(i) a vector sum of linear acceleration along the first linear detection axis and linear acceleration along the second linear detection axis is greater than a threshold linear acceleration magnitude; and (ii) a scalar sum of an absolute value of linear acceleration along the first linear detection axis and an absolute value of linear acceleration along the second linear detection axis is greater than a threshold linear acceleration magnitude.

* * * * *